(12) United States Patent
Baribault et al.

(10) Patent No.: US 11,847,307 B2
(45) Date of Patent: Dec. 19, 2023

(54) INTELLIGENT CONTENT DISPLAY FOR NETWORK-BASED COMMUNICATIONS

(71) Applicant: Microsoft Technology Licensing, LLC, Redmond, WA (US)

(72) Inventors: Gregory Paul Baribault, Sammamish, WA (US); Samuel James Ludwig Albert, Sammamish, WA (US); Shiraz Jitendra Cupala, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/100,371

(22) Filed: Jan. 23, 2023

(65) Prior Publication Data

US 2023/0236715 A1 Jul. 27, 2023

Related U.S. Application Data

(63) Continuation of application No. 17/537,287, filed on Nov. 29, 2021, now Pat. No. 11,561,686.

(60) Provisional application No. 63/187,231, filed on May 11, 2021.

(51) Int. Cl.
*G06F 3/04845* (2022.01)
*G06V 40/18* (2022.01)
*G06V 10/24* (2022.01)
*H04L 67/75* (2022.01)

(52) U.S. Cl.
CPC .......... *G06F 3/04845* (2013.01); *G06V 10/24* (2022.01); *G06V 40/193* (2022.01); *H04L 67/75* (2022.05)

(58) Field of Classification Search
CPC .. G06F 3/04845; G06V 10/24; G06V 40/193; H04L 67/75
See application file for complete search history.

(56) References Cited

U.S. PATENT DOCUMENTS

2017/0177288 A1* 6/2017 Wingrove ............. G06F 3/1423

* cited by examiner

*Primary Examiner* — Andrey Belousov
(74) *Attorney, Agent, or Firm* — Schwegman Lundberg & Woessner, P.A.

(57) ABSTRACT

Disclosed in some examples are devices, methods, systems, and machine-readable mediums for enhanced meeting room solutions to provide increased inclusiveness for both remote and in-room participants for network-based communication sessions, such as hybrid network-based communication sessions. Content of a first type is placed in a location exclusive of a discontinuity in a display device and content of a second type is placed in a location inclusive of the discontinuity of the display device.

20 Claims, 16 Drawing Sheets

INTELLIGENT CONTENT DISPLAY FOR NETWORK-BASED COMMUNICATIONS

PRIORITY CLAIM

This application is a continuation application of U.S. patent application Ser. No. 17/537,287, filed Nov. 29, 2021, which patent application claims the benefit of priority, under 35 U.S.C. Section 119 to U.S. Provisional Patent Application Ser. No. 63/187,231, entitled "Intelligent Content Display for Network-Based Communications," filed on May 11, 2021, to Baribault, et al, which are hereby incorporated by reference herein in their entirety.

TECHNICAL FIELD

Embodiments pertain to graphical user interfaces for network-based communications. Some embodiments relate to modified graphical user interfaces (GUIs) of network-based communications, the modified GUIs displayed on displays having one or more apertures. The aperture may be for a camera mounted behind the display. Some embodiments relate to adjusting videos of participants of the network-based communications based upon an eye level adjustment.

BACKGROUND

Network-based communications services provide communications such as voice calling, video calling, and network-based meetings (such as video conferencing) in which multiple users can exchange voice, video, and share contents of their display (screen sharing). For video conferencing, most users and conference rooms provide a camera that is mounted either below, or above a display screen.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
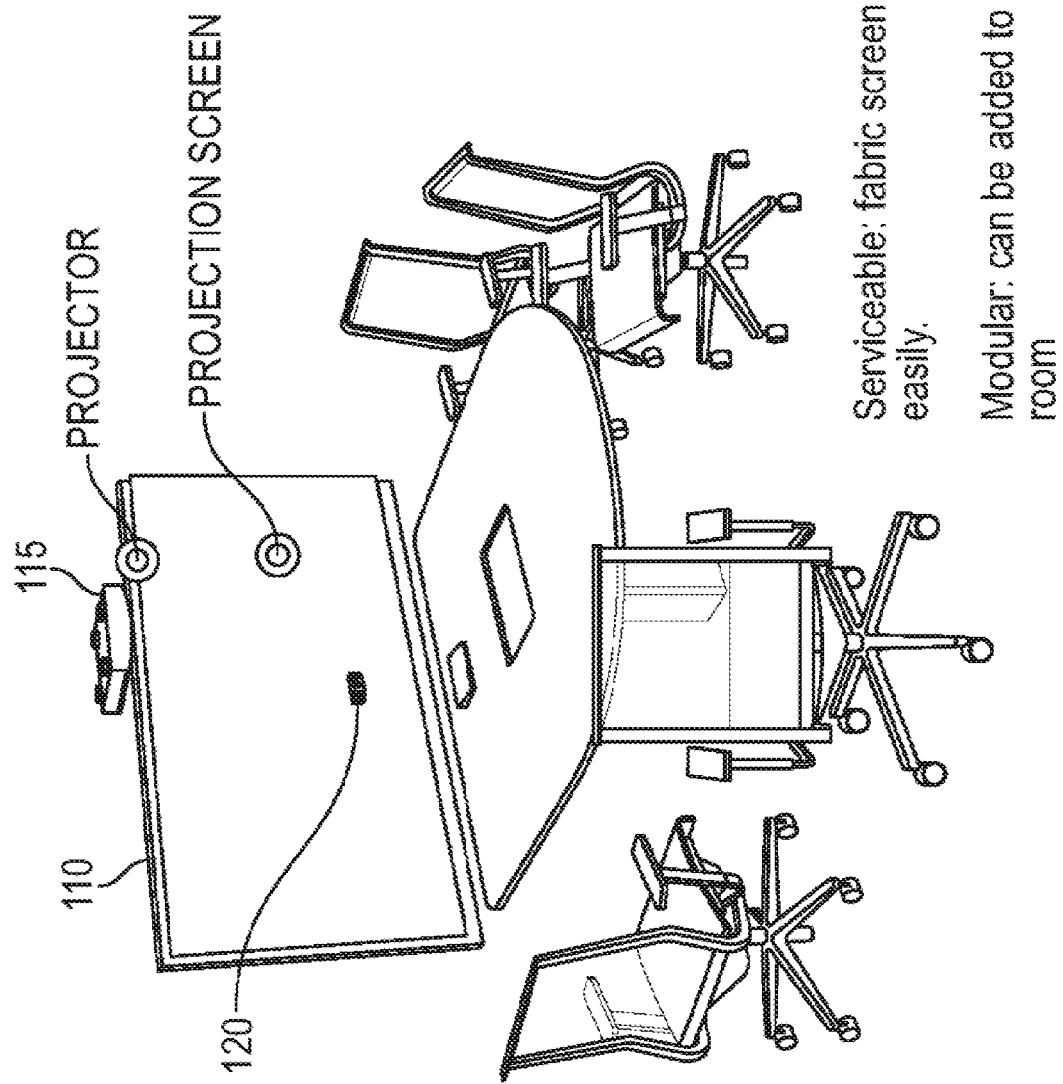
FIG. 1 illustrates an example network-based communication device according to some examples of the present disclosure.

Hybrid network-based communication sessions connect people joining the session remotely with people joining together from a dedicated meeting space. These hybrid network-based communication sessions are becoming more and more popular due to the increasingly remote workforce. Current hybrid network-based communication sessions may display users in the dedicated meeting spaces as just one of multiple faces seen around a table compressed into a small box on the video grid. These traditional hybrid network-based communication sessions do not list individual participants in the session as the meeting room itself is listed. In addition, individual participants are not able to virtually raise their hand, provide a meeting reaction, leverage collaboration tools to whiteboard, share meeting content, have their input attributed to them in the transcript, and the like.

As used herein, a network-based communication session comprises a session setup between one or more individuals in which packets of audio, video, content, screen sharing, chat information, and the like are exchanged. The audio and video may be exchanged in real-time or near real time. Examples include network-based meetings, video calls, VoIP calls, and the like. In some examples, the network may include packet based networks, switch networks, or a combination. A hybrid network-based communication session comprises a network-based communication session that includes at least one participant device that is providing the network-based communication session for at least two participants in a same physical room.

Disclosed in some examples are devices, methods, systems, and machine-readable mediums for enhanced meeting room solutions to provide increased inclusiveness for both remote and in-room participants for network-based communication sessions, such as hybrid network-based communication sessions.

In particular, in some examples an enhanced network-based communication session may include a display with one or more cameras mounted within the display. The cameras may be mounted such that light from a small aperture in the display screen enters a lens of the camera and is used as the camera that captures video of one or more participants of a network-based communication session (such as a video conference) that are viewing the display. The aperture may be at an eye level of users within the room such that the camera behind the aperture is mounted at an eye level of participants in the room. As used herein, an aperture is a location on the display that allows light to penetrate the display and strike a lens of a camera. For example, the aperture may be a hole in a screen of the display, a light emissive material, or the like. It should be noted that the aperture in the display screen is distinct from an aperture that is part of a camera behind the display screen. Having an aperture in the display presents problems for presenting content of the network-based communication session in a GUI.

Disclosed in some examples are devices, methods, systems, and machine-readable mediums for content layout on a display screen with an aperture. Because the display has a small aperture, any content of the network-based communication session displayed in the location of the aperture may be hidden by the aperture; or, if not directly hidden by the aperture, the aperture may be visually distracting to the users viewing the content nearby the aperture. The inventors have recognized that the aperture is less visually distracting when certain types of content are placed over, or around the aperture. For example, the aperture is less distracting to users when videos and other types of dynamically changing content are placed over or around the aperture in comparison to static content such as a slide presentation, a screen sharing screen, or other static content. Additionally, content displayed over or around the aperture may need to be modified (e.g., have black pixels inserted or other changes made) so as not to interfere with the camera. For example, if the GUI is provided by a projector, the black pixels would ensure that light is not transmitted through the aperture by the projector.

Other example improvements to the network-based communication session include segmented video of participants so that each participant is shown with a standardized background. Participant video may be modified, such as by removing a background, scaling, rotating, translating, and positioning the videos to achieve the effect of a group of participants within a same setting—such as at a same table or on a same stage. In some examples, in order to increase the effectiveness of this presentation, the system may calibrate features of the participant videos such that detected body parts, such as heads or eyes, are similarly sized with a similar height and are consistent, aligned, and similar looking.

In some examples, other improvements may include positional audio for the participant video gallery such that speakers on the left sound like they are coming from the left to enhance the natural feeling of the meeting. In some examples, the meetings may include enhanced user interfaces that provide at-a-glance access to relevant meeting content and meeting lifecycle info, at the right time, and in the right place. Other improvements may include awareness of in-room participants, so the roster can present people that are within the room separately; identification of in-room speakers; support for multiple cameras and a "virtual producer" model to provide additional video streaming of meeting room context as well as individual participants; isolated video streams from the room, allowing each in-room participant to be pinned, spotlighted, or segmented; content capture cameras, and the like.

Additionally, as noted, when displaying images of participants such as remote participants, participant video may be taken with different cameras, with different resolutions, different focal lengths, and at different angles. The presently disclosed system may detect a location of a particular feature (e.g., a body part such as a head or eyes) of the user and adjust the videos of participants such that the features of the users are aligned with each other, and/or with an eye level of a user utilizing a local display and are sized consistently with a consistent orientation.

The present disclosure thus solves various technical problems related to providing more natural communication session experiences with various technical solutions. For example, the present disclosure solves the technical problem of more closely imitating a face-to-face experience for both remote and in-person participants by allowing for eye contact through the technical solution of locating a camera at an eye level of a user. The technical problem of having the camera at such locations includes technical solutions of placing the camera within, behind, or on top of the screen at the correct location. This then creates other technical problems related to the distracting visual presence of apertures, discontinuities, and the like. The technical problem of distracting apertures, discontinuities, or the like in the screen is then solved with the technical solution of strategic placement of content of the meeting by prioritizing content placement of static content at other locations of the display and placing dynamic content at locations inclusive of the discontinuities. This ensures that the aperture or other discontinuity created by the camera is not distracting to the users. In other examples, the system solves the technical problem of each participant having different video cameras at possibly different angles and orientations. This may cause an incongruity in the communication session display. This is solved by the technical solution of modifying video streams of users such that the position of the users (e.g., their heads) are normalized with respect to each other, creating a more cohesive experience in which users look like they are in a same setting.

FIG. 1 illustrates an example network-based communication device according to some examples of the present disclosure. The device includes a screen 110, a projector 115 and a camera 120. The screen 110 may include speakers on the back (not shown in FIG. 1). In some examples, the camera may have multiple lenses (as shown, three), each angled at a different direction to more directly capture a subset of participants. The angle may be chosen or configured based upon the seating position of participants. As shown in FIG. 1, the camera has three lenses. The placement of the camera may be configured to be at an eye level of the users of the room. While a projection screen is shown in FIG. 1, in other examples, an LCD or other display technology may be used.

Figure 2:
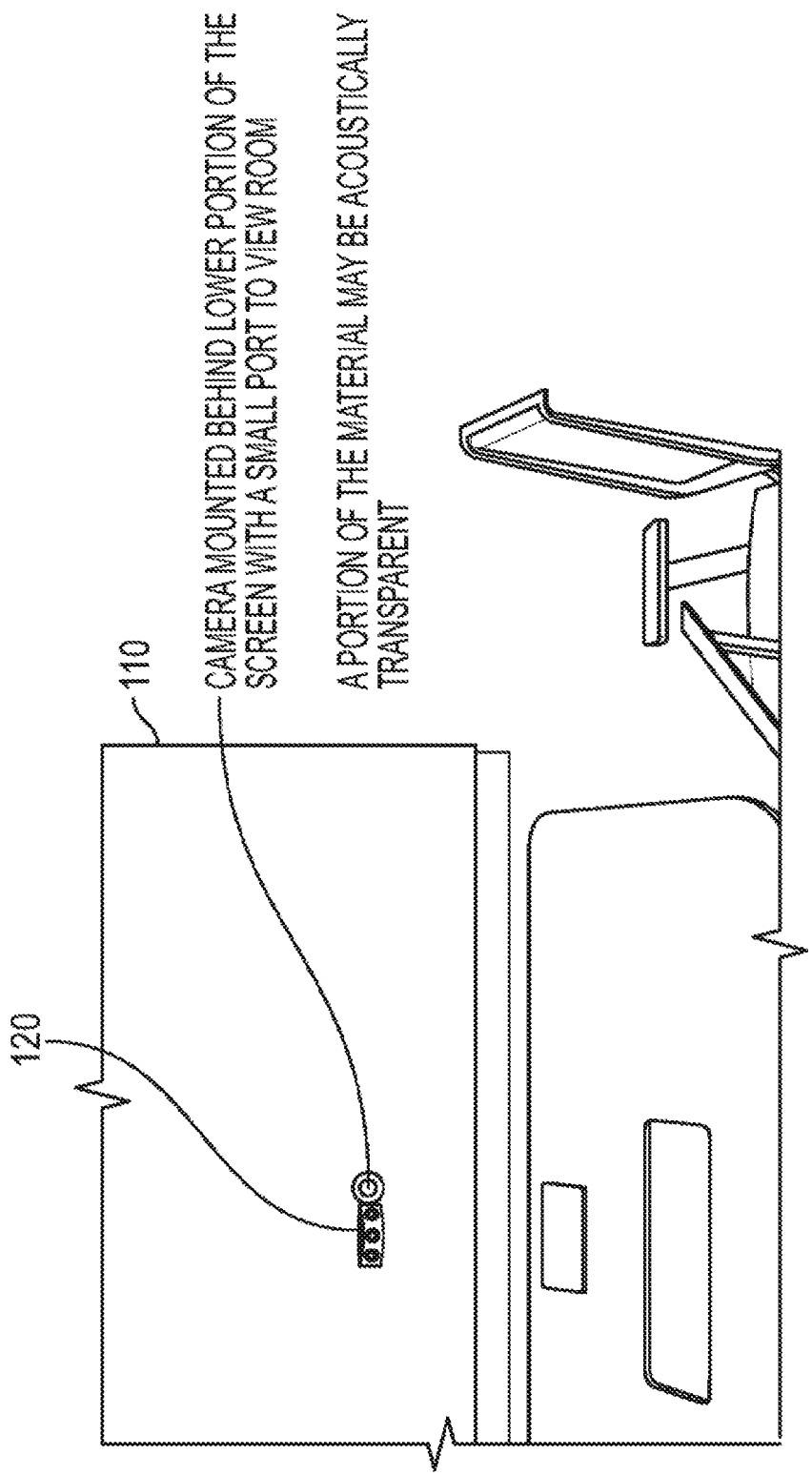
FIG. 2 illustrates a closeup of the screen and camera according to some examples of the present disclosure.

FIG. 2 illustrates a closeup of the screen 110 and camera 120 according to some examples of the present disclosure. Camera 120 may be a 160-degree camera that is recess mounted behind the lower portion of the screen with a small aperture to view the room. In some examples, a portion of the screen may be acoustically transparent for allowing sound from speakers behind the screen to enter the room. In some examples, the camera may be mounted to a surface of the display. In some examples, the camera may be mounted in front of the display using an arm or other device. While the term aperture is used herein to describe the position of an opening in a display screen behind which a camera is positioned, the methods, devices, systems, and machine-readable mediums described here that relate to GUI improvements for a camera behind an aperture apply equally to a camera attached to a surface of the display or attached in front of the display using an arm or other device.

Figure 3:
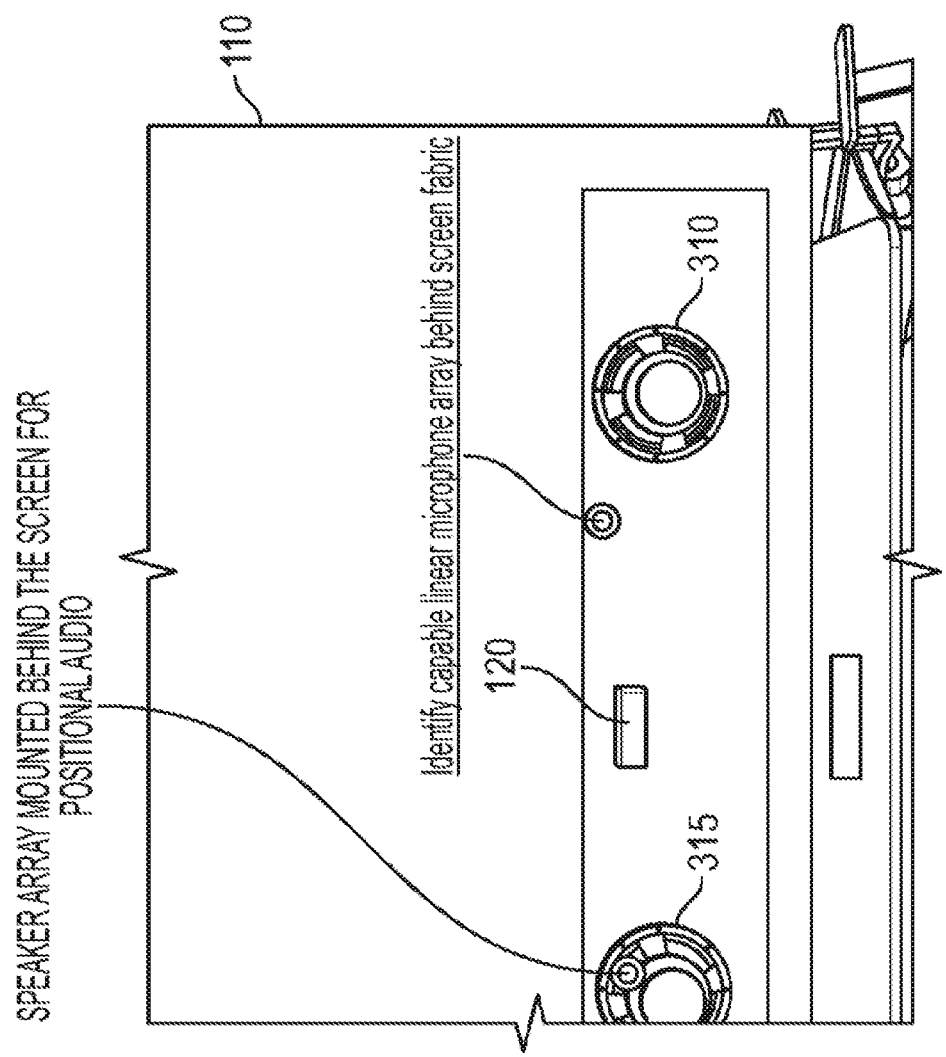
FIG. 3 illustrates a view of the back of the screen with camera according to some examples of the present disclosure.

FIG. 3 illustrates a view of the back of the screen 110 with camera 120 according to some examples of the present disclosure. Two speakers 310 and 315 are shown which may create a stereo sound effect. In some examples, the output of each speaker may be increased or decreased to localize the sound based upon where on the screen 110 the sound is coming from. For example, if a video of a user speaking is displayed closer to the speaker 310, the volume of that audio may be boosted at speaker 310 and/or reduced at speaker 315. In some examples, a linear microphone array that is capable of identifying an identity of a speaker is also present.

Figure 4:
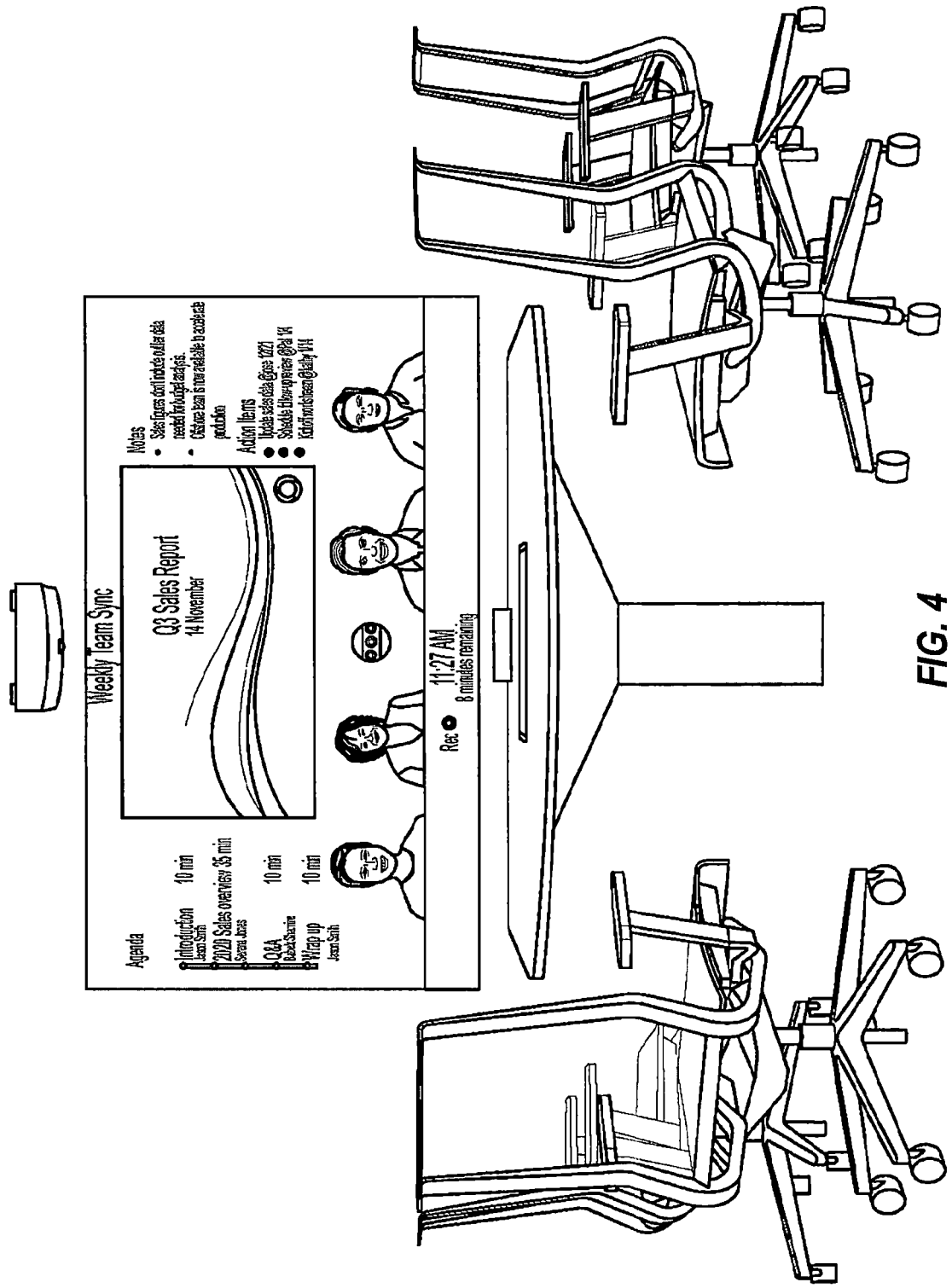
FIG. 4 and FIG. 5 illustrate a diagram of a GUI of a network-based communication service for display on a display with an aperture, such as an aperture for a camera according to some examples of the present disclosure.
Figure 5:
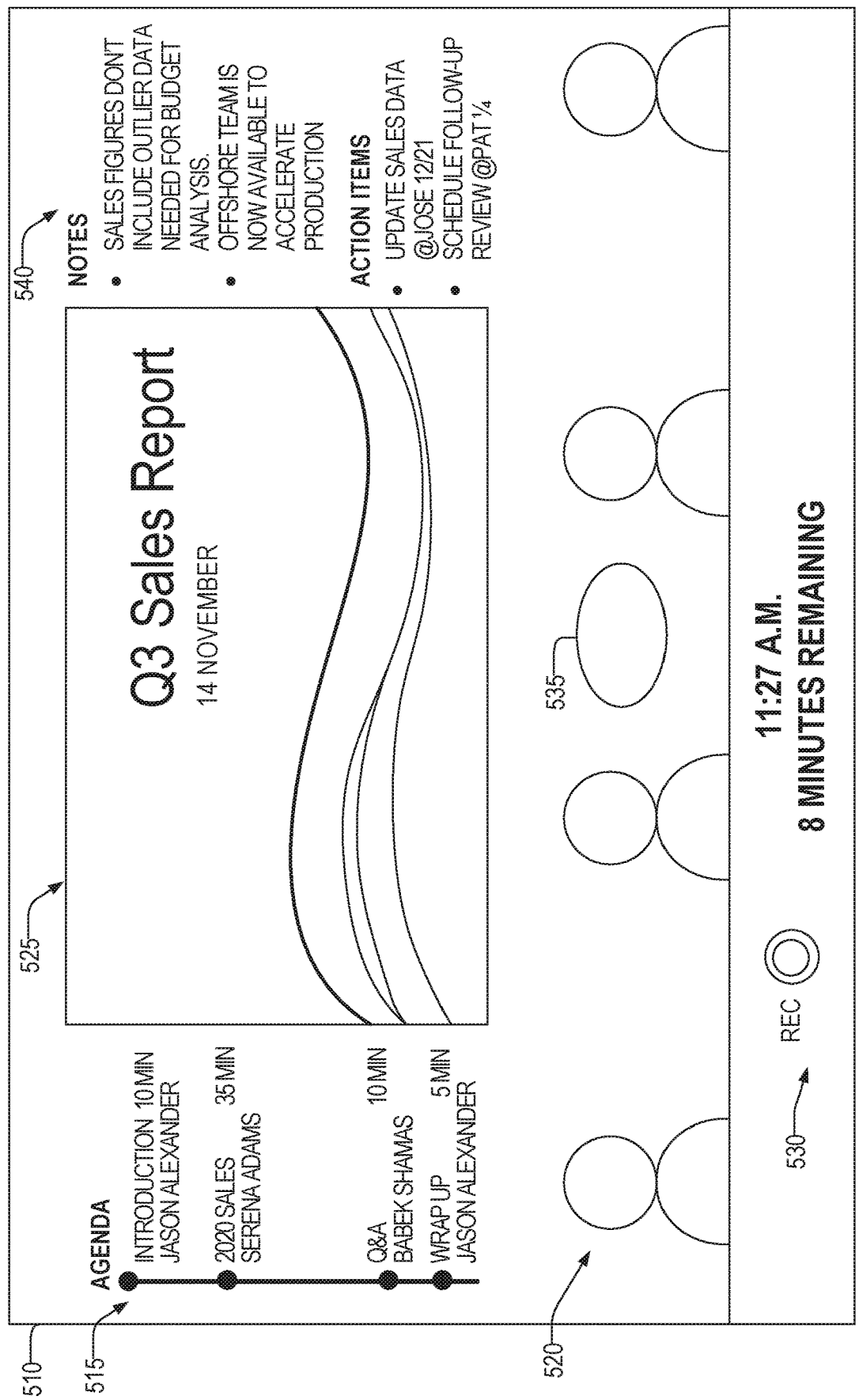

FIG. 4 and FIG. 5 illustrate a diagram of a GUI of a network-based communication service for display on a display with an aperture, such as an aperture for a camera according to some examples of the present disclosure. Display 510 shows five content sections 515, 520, 525, 530, and 540 which may display a variety of content of the network-based communication service. Content shown in these sections in FIG. 5 is exemplary. The displayed content may be reconfigured from the content displayed when the GUI is displayed on a display without an aperture. For example, the system may detect the aperture in the screen, and may reconfigure the GUI elements appropriately and as described herein.

Content section 515 shows a meeting agenda along with a progress bar. The agenda includes a plurality of sections along with a presenter for that section and an estimated completion time. The vertical bar to the left of the agenda with the dots may visually indicate when each item is completed and the progress of the meeting. For example, each segment of the bar may have a color indicating whether the item is completed, currently being discussed, or not yet being discussed. The progress of the vertical bar may be manually adjusted by a meeting organizer or other participant, may be tied to metadata of the content (such as a slideshow) shown in content section 525, or may be based upon the estimated time shown in the agenda. For example, slides shown in a content section 525 may correspond to items in the agenda. A particular slide and a particular agenda item may be specified in metadata for the slide. Advancing a slide to a slide corresponding to a next item in the agenda may cause the vertical bar to change to indicate a new topic. In addition, the system may infer how much time is left on an agenda (and may partially advance the vertical bar) based upon a number of slides between topic changes. For example, if a first slide corresponds to a first topic and a fifth slide corresponds to a second topic, the system may infer, when the third slide is displayed that the first topic is over half-way done. In other examples, the amount of content (e.g., the amount of text, a length of a video, and the like) on a slide may also factor into the changes of the progress bar. In yet other examples, a topic may be inferred using one or more machine-learning analysis on audio of the communication session. The audio may be automatically transcribed and input to a topic inference machine-learning model (such as a Latent Dirichlet Algorithm) which may generate a topic. The topic may be matched to a previously submitted agenda.

Other example content for content section 515 may include a live transcription generated by a designated transcriber or an automated transcriber, other video content, audio content, screen sharing content, notes, action items, or the like.

In FIG. 5, the content section 525 shows a slideshow presentation. Content section 525 may show a variety of content including screen sharing content, application content, whiteboard content, video content, or the like. Content section 540 shows notes taken by a designated note taker as well as action items noted by the designated note taker. Other example content for content section 525 may include a live transcription generated by a designated transcriber or an automated transcriber, other video content, audio content, screen sharing content, agenda items, or the like.

Content section 520 may show a plurality of participants video streams. As shown, four participants have their backgrounds removed from the video streams, normalized as to height, position, rotation, and other features and placed linearly as if sitting at a table in a same room. In some examples, the content section 520 may be at, or near, an eye level of users of the display 510. Content section 520 may include the aperture for the camera 535.

Content section 530 may include meeting information such as the time of day, how much time is remaining and whether or not the meeting is being recorded. Other example content for content section 525 may include a live transcription generated by a designated transcriber or an automated transcriber, other video content, audio content, screen sharing content, agenda items, or the like.

Figure 6:
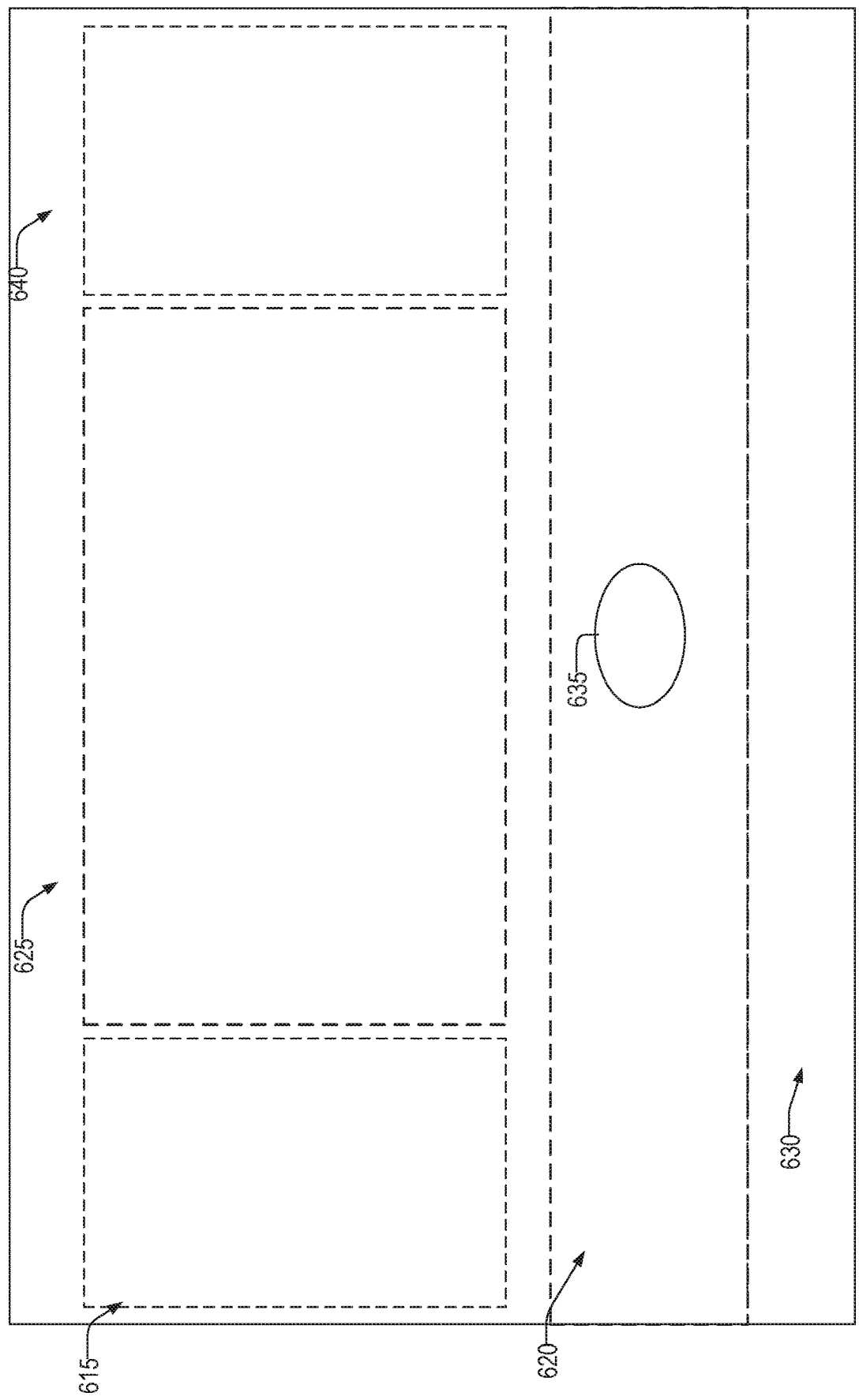
FIG. 6 illustrates a diagram of an example layout template of the display according to some examples of the present disclosure.

FIG. 6 illustrates a diagram of an example layout template of the display according to some examples of the present disclosure. Content sections 615, 625, 640, 620, and 630 may be configurable by a participant, administrator, or the like. In some examples, one or more layout templates, such as the example layout template in FIG. 6 may be selectable by users. Layout templates may include the location, size, and contents of content sections. In some examples, the content shown in content sections that are inclusive, or within a predetermined distance of the camera or aperture 635 may be restricted to provide the best experience. For example, by showing only dynamic content such as videos of participants. More static content such as slide show presentations where the content does not change as often may be placed in different content sections. In some examples, a plurality of different templates with different layouts for the network-based communication session may exist. When the system detects an aperture 635, the system may reconfigure the content such that a template compatible with an aperture (as indicated in metadata of the template) is selected.

As noted, the content in content section 620 may be placed around the camera. That is, the system may identify the location of the camera or aperture 635 on the screen and, using the boundaries of the content section 620, place the content such that it is not displayed at the position of the camera or aperture 635. For example, as shown in FIG. 5, the participants are not displayed at the position of the aperture. In some examples, where the GUI is projected onto a screen, the GUI may display black pixels at the location of the camera or aperture 635. This is to prevent light from the projector from entering the aperture and preventing the camera or aperture 635 from obtaining a good image of participants.

In some examples, the aperture may be very small and thus placement of content around the aperture or camera 635 may be possible. In some examples, a participant's video image maybe placed at the location of the aperture of the camera 635. In these examples, a portion of an image of the user may be displayed above, below, to the left and/or right of the aperture. That is, the aperture may be surrounded by, and directly adjacent to, content on one or more sides. For example, the aperture may be in a middle of an image of a participant. In these examples, black pixels may be inserted into the video of the participant at the location of the camera in examples in which the GUI is projected onto the display screen.

The template shown in FIG. 6 is an example template. In some examples, the templates may be selected from a plurality of valid templates. The plurality of valid templates may be further selected from a plurality of available templates based upon an identification of the display.

Figure 7:
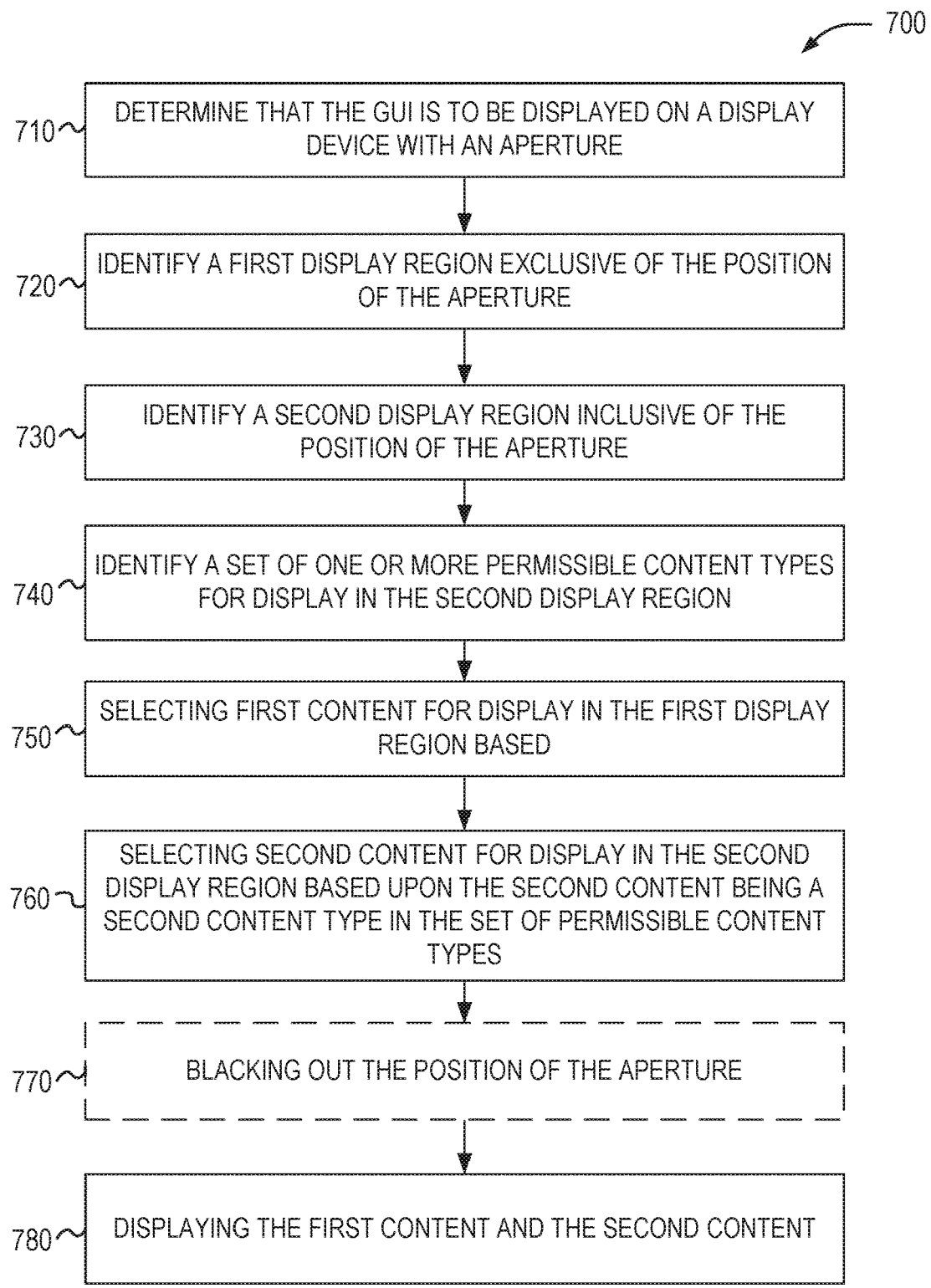
FIG. 7 illustrates a flowchart of a method for configuring a graphical user interface (GUI) of a network-based communication for display on a display device having an aperture within the display or camera on the display according to some examples of the present disclosure.

FIG. 7 illustrates a flowchart of a method 700 for configuring a graphical user interface (GUI) of a network-based communication for display on a display device having an aperture within the display or camera on, or in front of the display according to some examples of the present disclosure. Method 700 may be performed by one or more of a communication device—such as a computing device of a participant, a meeting room computing device, a server of a communication service (e.g., such as a media server), or the like. In some examples, method 700 may be performed by a communication application executing on a computing device. At operation 710, the system may determine that the GUI of the network-based communication is to be displayed on a display device having an aperture within the display or a camera attached to, or in front of, the display. For example, the device may determine that the display on which the GUI is to be displayed includes an aperture or camera based upon a previous configuration by a user. In other examples, metadata about the display (such as an Enhanced Display Identification Data (EDID)) may be obtained by the system. The information may include a location and size of the aperture or camera on the display, a size of the entire display, calibration information including a position of the camera relative to the display, color information of the display, and the like. In still other examples, the system may determine an aperture position by projecting a test pattern on the display. For example, a moving image may be displayed. The input of the camera may be compared to detect when the moving image is detected by the camera. In still other examples, a test pattern (such as a gradient) may be displayed and the output of the camera may be compared to the test pattern to determine where the camera is relative to the image displayed.

Operations 720-780 may be performed responsive to the determination in operation 710 that the GUI is to be displayed on a display device with an aperture. At operation 720, the system may identify a first display region that is exclusive of a position of the aperture. At operation 730, the system may identify a second display region that is inclusive of the position of the aperture, the first and second display regions non-overlapping. For example, a user may have pre-selected a template with the first and second regions. The template may be selected from a plurality of valid templates for the display identified in operation 710. In other examples, the user may have customized the layout of the communications GUI—e.g., by designating display regions for various content of a communication session. In other examples, the system may dynamically determine a layout based upon the identified display in operation 710. For example, by identifying a camera location relative to the screen and using that relative location to identify a corresponding location within the GUI (e.g., a location of the GUI where the camera would interfere with the layout or visibility of the GUI). The system may assign the second region to a location based upon the identified location within the GUI. The system may determine the size of the second region based upon the content selected for the region. In some examples, the remaining space may be assigned to the first display region, and/or other display regions depending on the content that is to be displayed.

At operation 740, the system may identify a set of one or more permissible content types of the network-based communication for display on the second display region. For example, a network-based communication session may have a plurality of possible content types that may be displayed. A first set of the plurality of possible content types may be designated (e.g., by an administrator) as suitable for display within the second display region.

At operation 750, the system may select first content of the network-based communication session for display in the first display region based upon the first content being a first content type that is not within the set of one or more permissible content types. At operation 760, the system may select second content of the network-based communication session for display in the second display region based upon the second content being a second content type that is in the set of one or more permissible content types.

At operation 770, for some displays, such as projection displays, black pixels may be inserted into the GUI at the position of the aperture. This is to prevent light from shining into the aperture and ruining the video. At operation 780, the system may display the first content in the first display region and the second content in the second display region.

Figure 8:
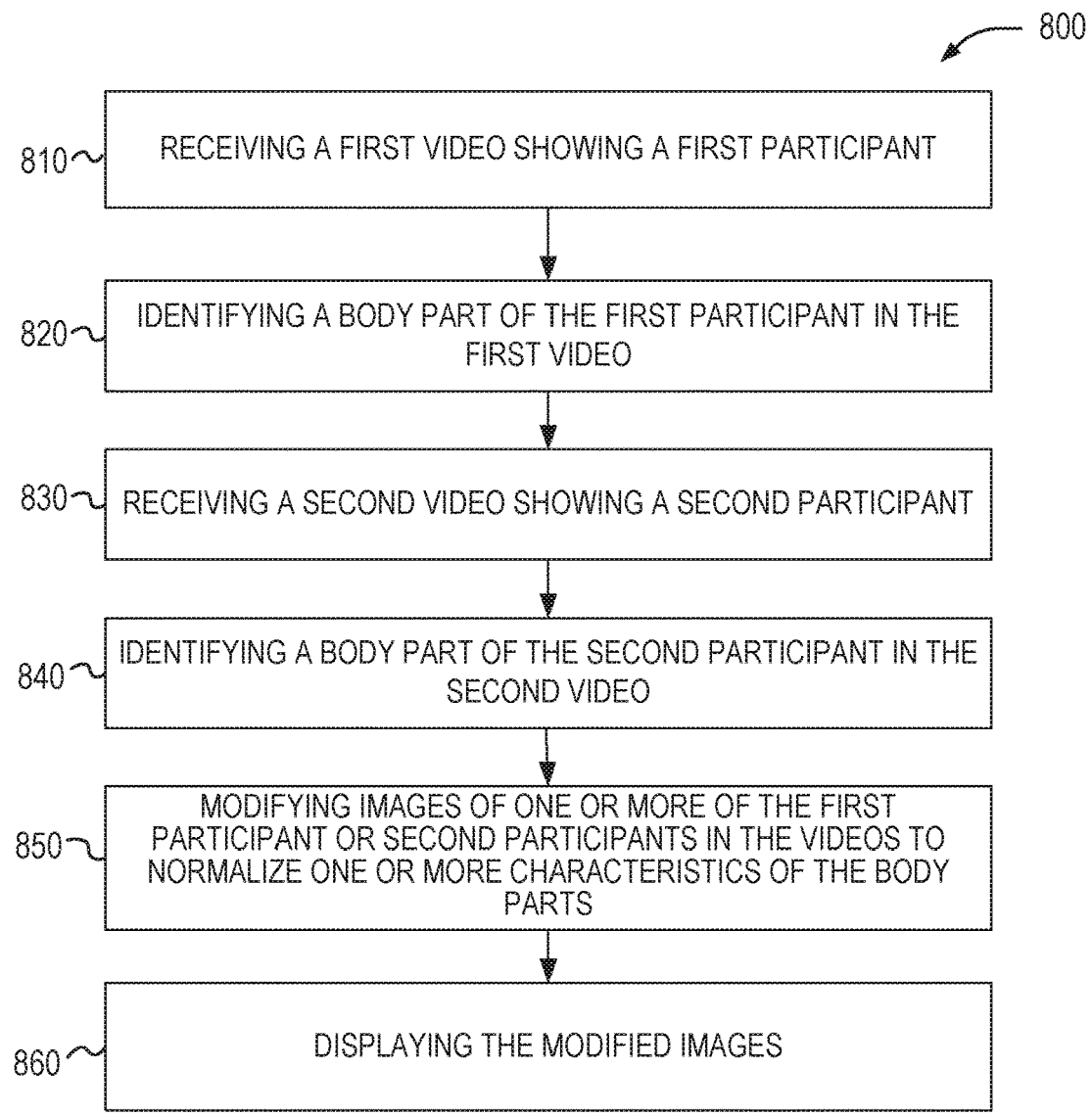
FIG. 8 illustrates a flowchart of a method of configuring a graphical user interface (GUI) of a network-based communication to modify characteristics of a plurality of participant video streams based upon detected body positions in the plurality of participant video streams according to some examples of the present disclosure.

FIG. 8 illustrates a flowchart of a method 800 of configuring a graphical user interface (GUI) of a network-based communication to modify characteristics of a plurality of participant video streams based upon detected body positions in the plurality of participant video streams according to some examples of the present disclosure. Method 800 may be performed by one or more of a communication device—such as a computing device of a participant, a meeting room computing device, a server of a communication service (e.g., such as a media server), or the like.

At operation 810, the system may receive a first video showing a first participant in a network-based communication. At operation 820, the system may identify a body part of the first participant in the first video. For example, the system may use a region-based convolutional neural network (R-CNN), support vector machine (SVM), or other machine-learned model. At operation 830, the system may receive a second video showing a second participant in the network-based communication. At operation 840, the system may identify a body part of the second participant in the second video. For example, the system may use a region-based convolutional neural network (R-CNN), support vector machine (SVM), or other machine-learned model. In some examples, the body part identified may also be located (e.g., by the algorithms above) and/or a size of the body part determined. The body part may include a head of a user, eyes of a user, ears of a user, nose of a user, mouth of a user, or the like. In some examples, the body part determined at operation 820 is a same body part determined at operation 840; in other examples the body part may be different.

At operation 850, the system may modify images of one or more of the first participant in the first video or the second participant in the second video to normalize one or more characteristics of the body part of the first participant and the body part of the second participant. For example, the system may make a head size and orientation of a head of the first and second participants a same size and orientation. In other examples, an eye gaze may be normalized by normalizing and/or aligning the locations of eye levels across all attendees in a video stream and/or to a reference location (such as a local camera). This may be done by modifying the first video of the first participant, the second video of the second participant, or both videos. In some examples, this may include scaling, rotating, translating, cropping, or other adjustments to the body part, or the entire video. In some examples, the system may segment the participant from a background and the videos received in operation 810 and 830, and the operations of identifying and modifying in operations 820, 840, and 850 are performed on the video of the participant with the background already removed. For example, the system may use a region-based convolutional neural network (R-CNN), support vector machine (SVM), or other machine-learned model to remove the background.

In some examples, a desired size and orientation of the participant may be determined by the system based upon a region of the GUI in which the participants are to be placed along with the number of participants that are to be placed in that region. The participant's video (e.g., head and shoulders or head) are then scaled to fit the size. Orientation may be adjusted so that the users look similar. As such, the participant's video is scaled, rotated, or adjusted, based upon detected features of the user such as eyes of the user or head of the user. For example, the size and position of the eyes or head may be used to determine a scaling factor, rotation angle, or the like that is used to modify the images at operation 850. At operation 860, the system may display the adjusted first and second video in the GUI as part of the network-based communication. In some examples, a size of the display and a number of participants that are desired to be displayed may also be used to select a characteristic of the participant's video.

In some examples, the system may align the videos of the first and second participant such that an eye level is aligned (either horizontally aligned for vertical placements of participant video images or vertically aligned for horizontally placed participant video images). In some examples, the eye level may be aligned, and the participant video images displayed on the GUI on same vertical position as a detected eye level of a local participant. For example, the local participant's eye level may be established using feature detection algorithms that analyze video from a video camera and knowledge of a location of a video camera or aperture within, on top of, or below a display. In the case of multiple participants in the room, an average eye level may be used. The video of remote participants may be normalized and displayed at a same eye level of the participant(s) in the room.

As noted, features of users may be detected such as a face, eyes, and the like. As also noted, backgrounds may be removed (e.g., the head and shoulders of a participant may be removed from a background). In some examples, various feature detection and/or segmentation algorithms may be used to accomplish this. One example algorithm may include a Region-Based Convolutional Neural Network (R-CNN) or similar algorithms may be used. R-CNN is described by Rich feature hierarchies for accurate object detection and semantic segmentation by Girshick, R., Donahue, J., Darrell, T., & Malik, J., Proceedings of the IEEE conference on computer vision and pattern recognition (2014). The R-CNN technique may first generate and extract candidate bounding boxes from the input image using a selective search mechanism. The R-CNN then submits each region of interest to a feature extractor, such as an AlexNet deep Convolutional Neural Network (CNN) or a Scale Invariant Feature Transform (SIFT), to extract features from the candidate bounding boxes. Finally, a classifier, such as a linear support vector machine (SVM) may be used to classify the features as one or more shapes. A different SVM may be trained to detect each different body part.

Other similar algorithms may be used, such as Fast R-CNN. Fast R-CNN may run the feature recognition neural network once on the whole image, rather than on each region of interest. Fast R-CNN then uses ROIPooling to slice out each region of interest from the output and classifies it. In other examples, Faster R-CNN may be used as described by Faster R-CNN: Towards Real-Time Object Detection with Region Proposal Networks by Shaoqing Ren, Kaiming He, Ross Girshick, and Jian Sun, IEEE Transactions on Pattern Analysis and Machine Intelligence (Volume: 39, Issue: 6, Jun. 1, 2017) which integrates region of interest generation into the neural network itself. In still other examples, the system may utilize a Region-Fully Convolutional Neural Network (R-FCN) as described by the paper R-FCN: Object Detection via Region-based Fully Convolutional Networks by Jifeng Dai, Yi Li, Kaiming He, and Jian Sun, $30^{th}$ Conference on Neural Information Processing Systems (NIPS 2016), Barcelona, Spain.

Instead of, or in addition to the R-CNN methods, the system may utilize a Single Shot Multibox Detector, described by Liu W. et al. (2016) SSD: Single Shot MultiBox Detector. In: Leibe B., Matas J., Sebe N., Welling M. (eds) Computer Vision—ECCV 2016. ECCV 2016. Lecture Notes in Computer Science, vol 9905. Springer, Cham. The SSD utilizes a VGG-16 neural network (a convolutional neural network model proposed by K. Simonyan and A. Zisserman from the University of Oxford in the paper "Very Deep Convolutional Networks for Large-Scale Image Recognition") architecture that replaces the fully connected layers with a set of auxiliary convolutional layers (from conv6 onwards) to enable feature extraction at multiple scales. The SSD is trained with ground truth bounding boxes and assigned class labels for each shape in the encoding dictionary.

Figure 9:
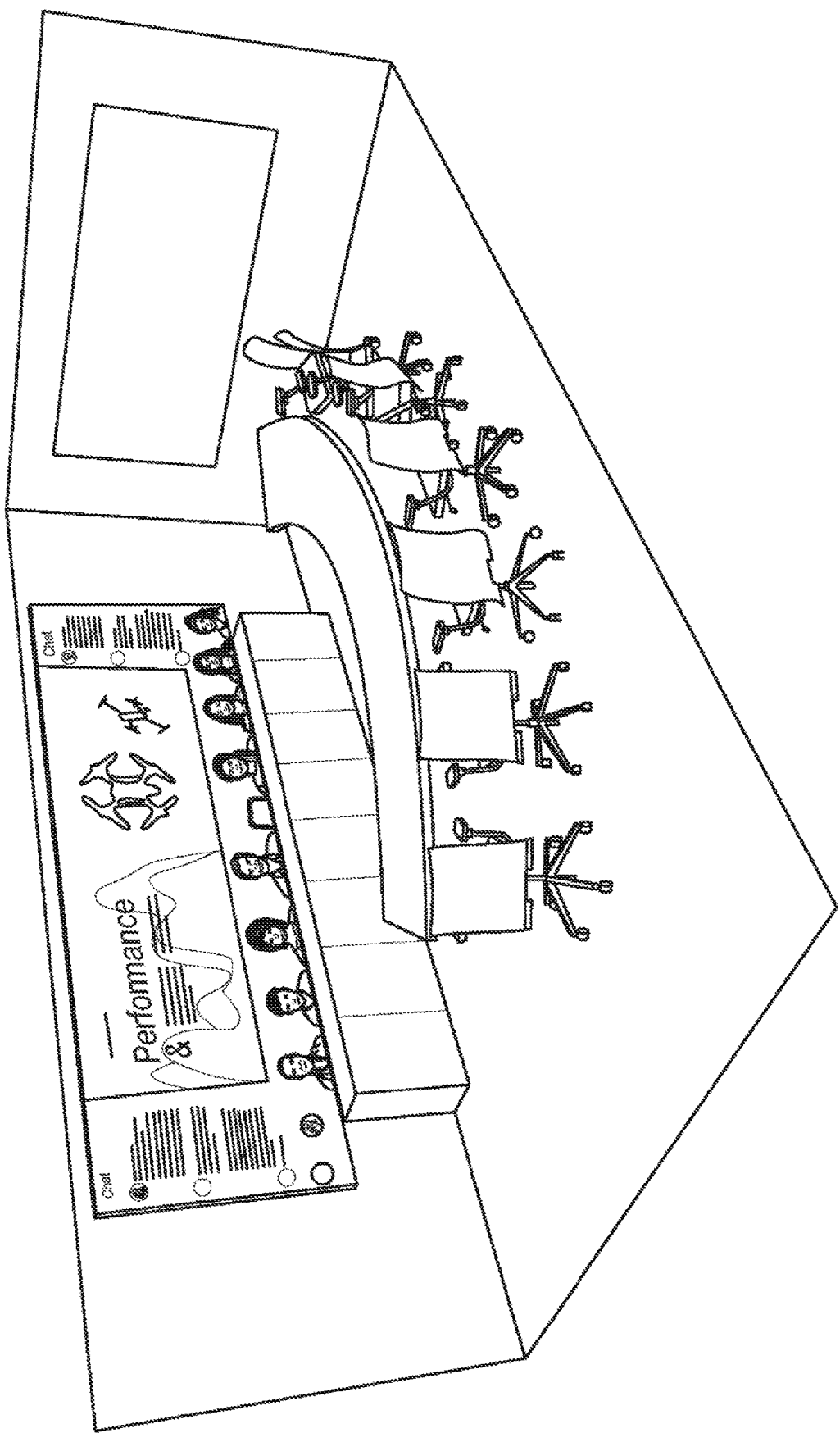
FIG. 9 illustrates another example in-room setup for a communication session with a display such as shown in FIGS. 1-6 according to some examples of the present disclosure.

FIG. 9 illustrates another example in-room setup for a communication session with a display such as shown in FIGS. 1-6. In FIG. 9, the design of the physical space rotates a standard meeting room by 90 degrees, projecting the communication session (e.g., meeting) experience on a longer wall. The A/V capabilities, and furnishings are designed to enhance eye contact between in-room participants and remote participants via the eye-level positioned cameras providing a more natural and more deeply connected experience.

The room's audio capture may support AI powered speaker identification and those speakers identified may have their comments attributed to them in a transcript, and their presence will be noted in a meeting roster. Additionally, the room's audio capture may include high fidelity echo and noise reduction, and on-mic wake word detection for digital assistant voice commands (e.g., CORTANA® by Microsoft). Multi-channel audio output may provide positional audio on a sound stage to align audio with a location of the audio as displayed on the visual gallery stage, as well as spatial audio for off-stage sounds including non-video remote speakers, system events like entry/exit notifications, reactions, and more. AI speaker identification may use one or more machine learning techniques such as hidden Markov models, Gaussian mixture models, pattern matching algorithms, neural networks, matrix representation, vector quantization, decision tree algorithms, or the like. Identified speakers may be labelled for remote users, and may be identified as present in the meeting. In addition to speaker recognition, facial recognition may be used to supplement, verify, or otherwise complement the speaker recognition, or may be used instead of speaker recognition. In some examples, the network-based communication session may present video of each individual within the room separately to remote participants by segmenting the user from a background.

The in-meeting experience may be calibrated to the room, using a process at installation time to align the vertical position and size of remote participants to match those in the room. Additionally, the meeting stage may provide live content including an agenda, countdown timer, action items, notes, in addition to the meeting content stage where whiteboard, PowerPoint, or other sharing content would be presented.

The table shown may be in the shape of an arc and may seat 8-10 people with personal laptops and other devices. The table may feature integrated power sockets for personal device charging. An integrated meeting console may be embedded into the table surface. Rolling outer 'wings' to support closing the arc for smaller discussions may be used (not shown).

The video display screen may include one or more projectors. Audio may include multi-channel speaker arrays mounted behind the screen for positional audio. An identity capable microphone array may be placed behind the display. A 160-degree camera may be recess mounted behind a portion of the screen with a small aperture to view the room. For example, the camera may be mounted at an eye level of in-room participants. The display may be provided by an integrated ultra short throw (UST) projector mounted above. The GUI of the communication service used to display content of a communication session may be calibrated precisely for this type of room. Calibration may include one or more of: awareness of camera location to prevent light from hitting the camera, gallery size (height & width) to provide the head-height consistency between in-room and remote participants, audio soundstage width, and noise reduction calibrated to the room's size and echo & noise characteristics. Calibration can be as simple as choosing from known furniture maker models or can be done manually by aligning and measuring/adjusting projected images.

As described, the present disclosure provides enhanced experiences for both in-room participants and remote participants. For example, people in the room will experience a more human to human conversation environment, reducing meeting fatigue and increasing productivity and focus. For example, high resolution, cleanly segmented video of remote participants may be displayed, giving each person a presence at a table, in the same virtual environment, reducing the distractions of the standard video gallery. The video gallery and content may be calibrated so the head size and height of remote participants is consistent, aligned, and similar to those in the room. In some examples, the arrangement of the video gallery may be horizontal only to encouraging a normal human head pan, vs. up/down/left/right scanning. Positional audio for the video gallery, putting audio and video rendering in the same space, making meetings more natural and engaging, and also less fatiguing by separating voices over a wide sound stage. In some examples, the display may feature at-a-glance access to relevant meeting content and meeting lifecycle info, at the right time, and in the right place.

For remote participants, cameras may be set at eye level, and in the gaze direction of in-room participants to promote better eye contact between all participants. The system features awareness of in-room participants, so the roster can present people based on where they are joining from. Identification of in-room speakers allows everyone to know who is speaking at any time. Support for multiple cameras, and a "virtual producer" model may provide additional video streaming of meeting room context as well as individual participants. Isolated video streams from the room allow each in-room participant to be pinned, spotlighted, or segmented for views like together mode as individuals. The rooms may feature lighting concepts that promote higher video quality. The system may also feature content capture camera(s), and seamless integration of digital whiteboard devices.

Figure 10:
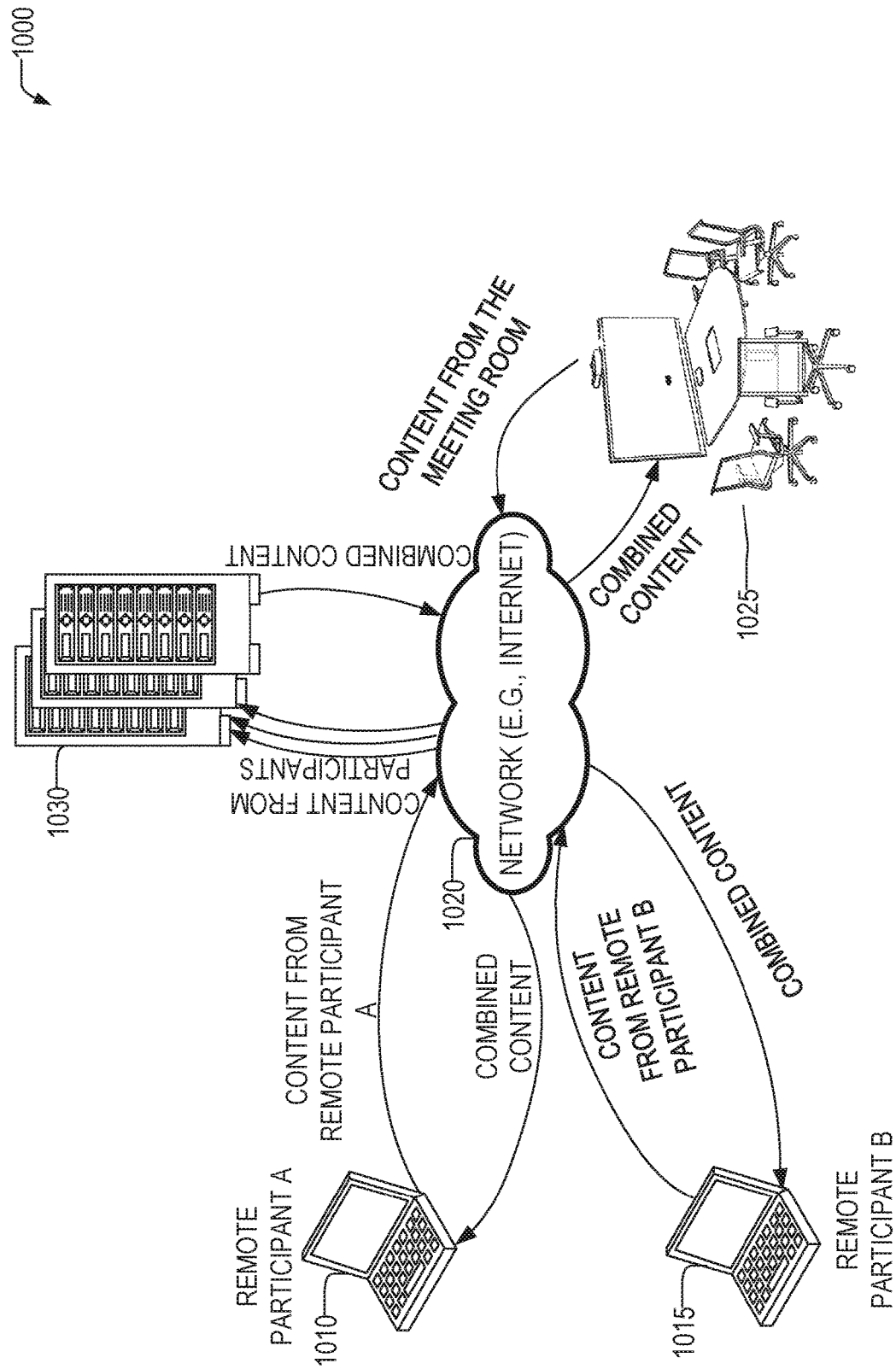
FIG. 10 illustrates a network-based communication system according to some examples of the present disclosure.

FIG. 10 illustrates a network-based communication system according to some examples of the present disclosure. Remote participant A 1010 and remote participant B 1015 are engaged in a network-based communication session with a computing device in meeting room 1025 (remote participant A 1010 and remote participant B 1015 are termed "remote" as they are remote from the meeting room 1025). Content from the remote participants and the meeting room is sent over a network 1020 to a server 1030 of the network based communication service. The server may mix the content into a combined content stream and send the combined stream back to the remote participant A 1010, remote participant B 1015 and to the meeting room 1025. Content may include audio, video, screen sharing information, and the like.

Figure 11:
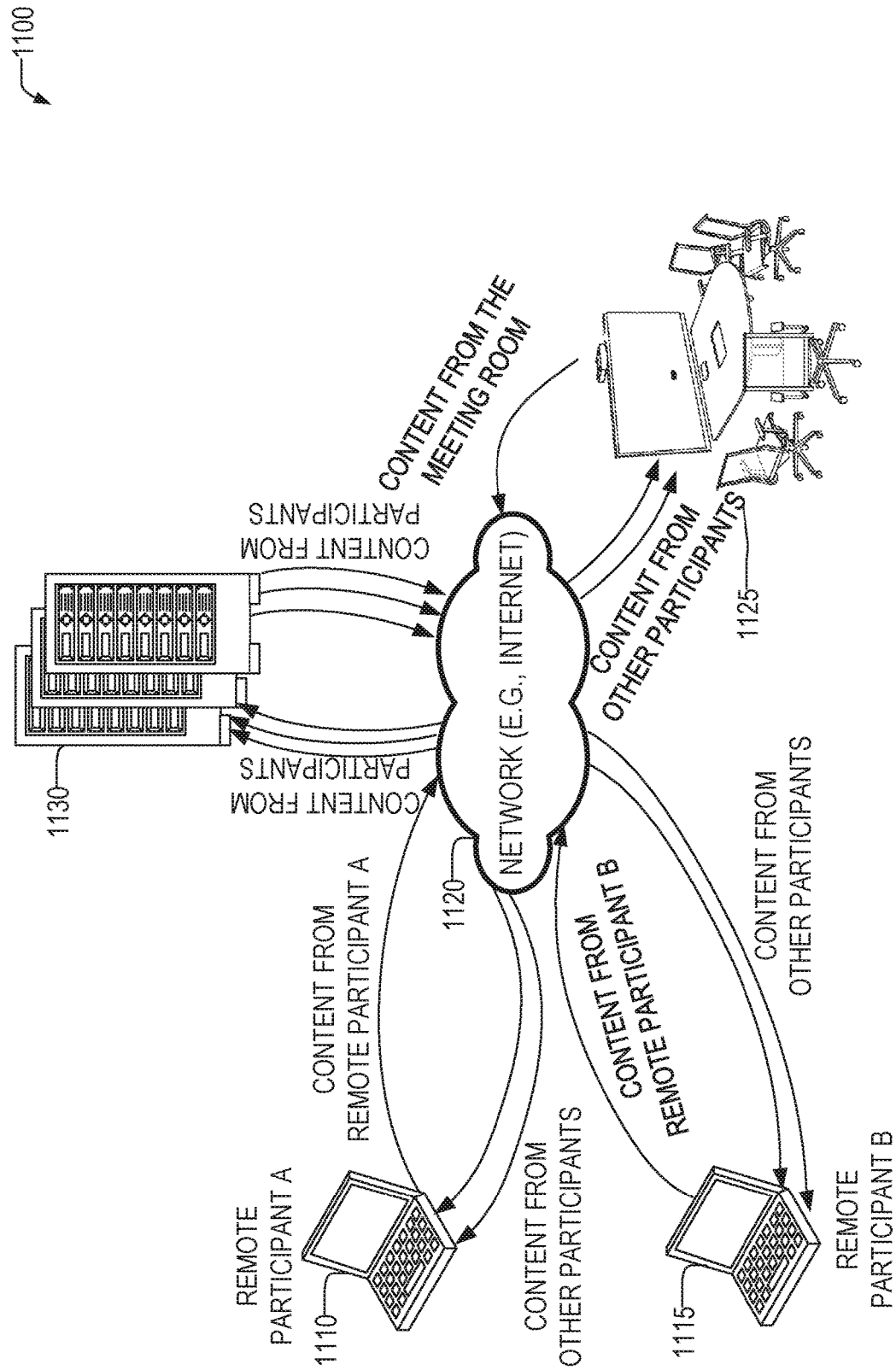
FIG. 11 illustrates a network-based communication system according to some examples of the present disclosure.

FIG. 11 illustrates a network-based communication system according to some examples of the present disclosure. Remote participant A 1110 and remote participant B 1115 are engaged in a network-based communication session with the meeting room 1125. Content from the remote participants and the meeting room is sent over a network 1120 to a server 1130 of the network based communication service. The server may forward each content stream to each participant. For example, the server 1130 may forward content from the meeting room 1125 and the remote participant B 1115 to the remote participant A 1110. Remote participant A 1110 may then mix the content and present it in a combined presentation. Content may include audio, video, screen sharing information, and the like.

In some examples, instead of forwarding the content from the participants, the server 1130 facilitates connections (e.g., direct, peer-to-peer, multicast, or broadcast connections) between the participants for the sending of content directly by a participant to another participant. That is, server 1130 may provide routing information to remote participant A 1110 to send the content from the remote participant A to both remote participant B 1115 and meeting room 1125. Similarly, the server 1130 may provide routing information to remote participant B 1115 to send the content from the remote participant B to both remote participant A 1110 and meeting room 1125; and the server 1130 may provide routing information to meeting room 1125 to send content to both remote participant B 1115 and remote participant A 1110.

Figure 12:
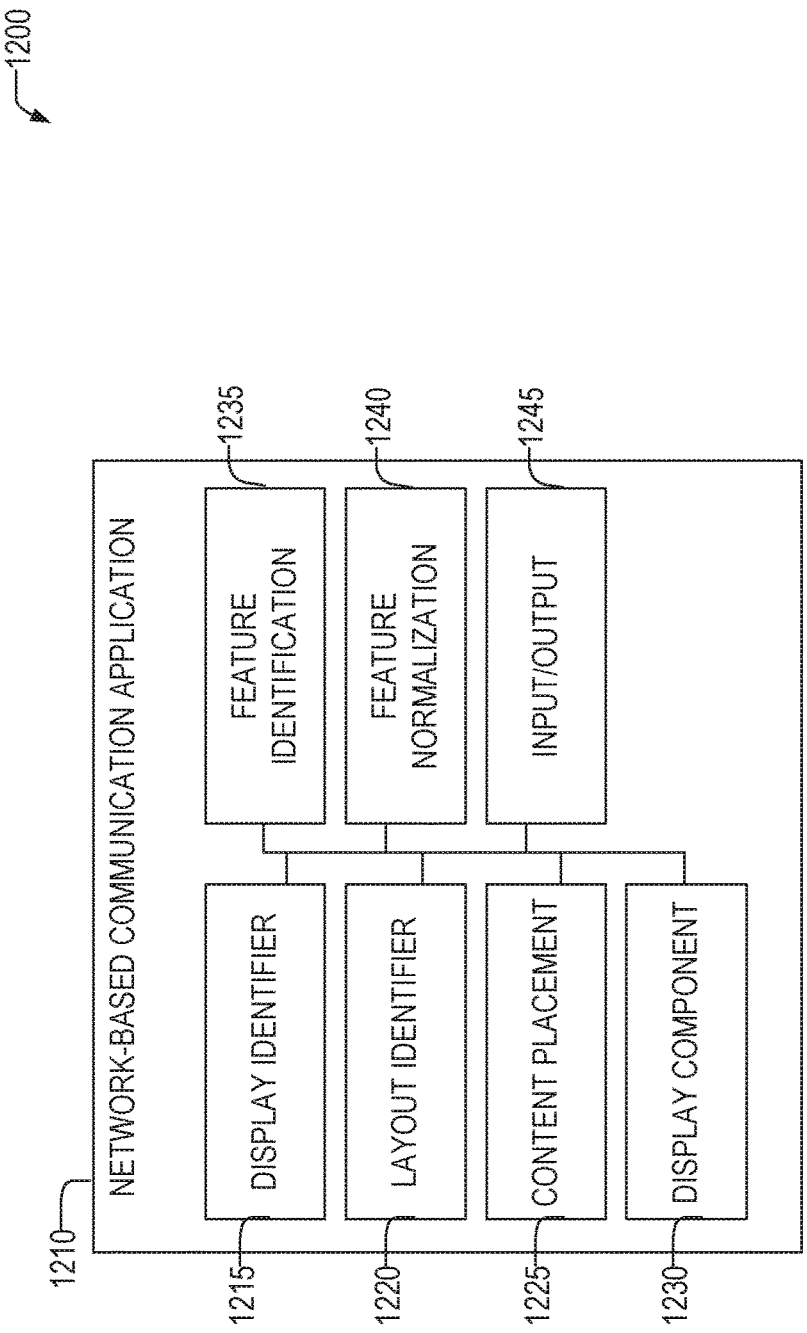
FIG. 12 illustrates a logical diagram of a network-based communication application 1210 according to some examples of the present disclosure.

FIG. 12 illustrates a logical diagram of a network-based communication application 1210 according to some examples of the present disclosure. Input and output component 1245 may receive data from other network-based communication applications or a network-based communication server. The data may include one or more of content data, control data, or the like. Input and output component 1245 may terminate one connection of or more protocols used to send the data of the network-based communication session such as Session Initiation Protocol (SIP), Real Time Transport Protocol (RTP), chat data, presence data, and the like. Data may be encoded according to one or more encoding algorithms and may be decoded by the input and output component 1245. Encodings may include Scalable Video Codec (SVC), an H.264 encoding, and the like.

Display identifier 1215 may identify a display on which a GUI of the network-based communication application is to be displayed. For example, the display identifier 1215 may inspect display properties to determine if the display includes an aperture or camera. Layout identifier 1220 may use the display id to determine an appropriate layout of the GUI. For example, based upon a selected GUI. In some examples, the display identifier 1215 may detect the display and the layout identifier 1220 may set the layout during a configuration setup. In other examples, the display identifier 1215 and layout identifier 1220 may come up with a layout based upon a size, orientation, and other properties of the display screen (such as a location of a camera or aperture for the camera) automatically.

During a network-based communication session, the content data received via the input and output component 1245, may be placed within a GUI by the content placement component 1225 and output via the display component 1230. Display component 1230 may interface with display hardware of the display to cause the display of the GUI. For example, the display component 1230 may interface with an operating system of the device to cause the display of the GUI. The content placement component 1225, or the layout identifier 1220, may enforce restrictions on content types in certain content regions of the GUI based upon one or more rules, such as rules regarding acceptable content types in regions that surround or include an aperture or camera.

Feature Identification component 1235 may identify one or more features (e.g., body parts) of video of participants. As stated before, this may include using one or more machine-learning models. The feature normalization component 1240 may normalize a size, position, orientation, and/or the like of a plurality of videos based upon the detected features. For example, a size of video of multiple participant's faces may be normalized to a same size using the detected faces of participants or based upon other detected features of participants. For example, a size of eyes, a distance between the eyes and the nose, or other detected features may be used to set a normalized size, orientation, position, and the like of each participant's face. The modified videos are input to the content placement component 1225 to be included in the GUI. Input from a camera, computing device for screen sharing data (such as application sharing), or the like may be received by input and output component 1245; encoded; and transmitted to other computing devices that are part of the network-based communication session or to a server hosting the network-based communication session. This input may be sent to the feature identification component 1235 to detect eyes of participants in the same room as the device on which the network-based communication application 1210 is executing. This information may be used by the content placement component 1225 and the feature normalization component 1240 to place the images of other participants at an eye level of a local participant.

Figure 13:
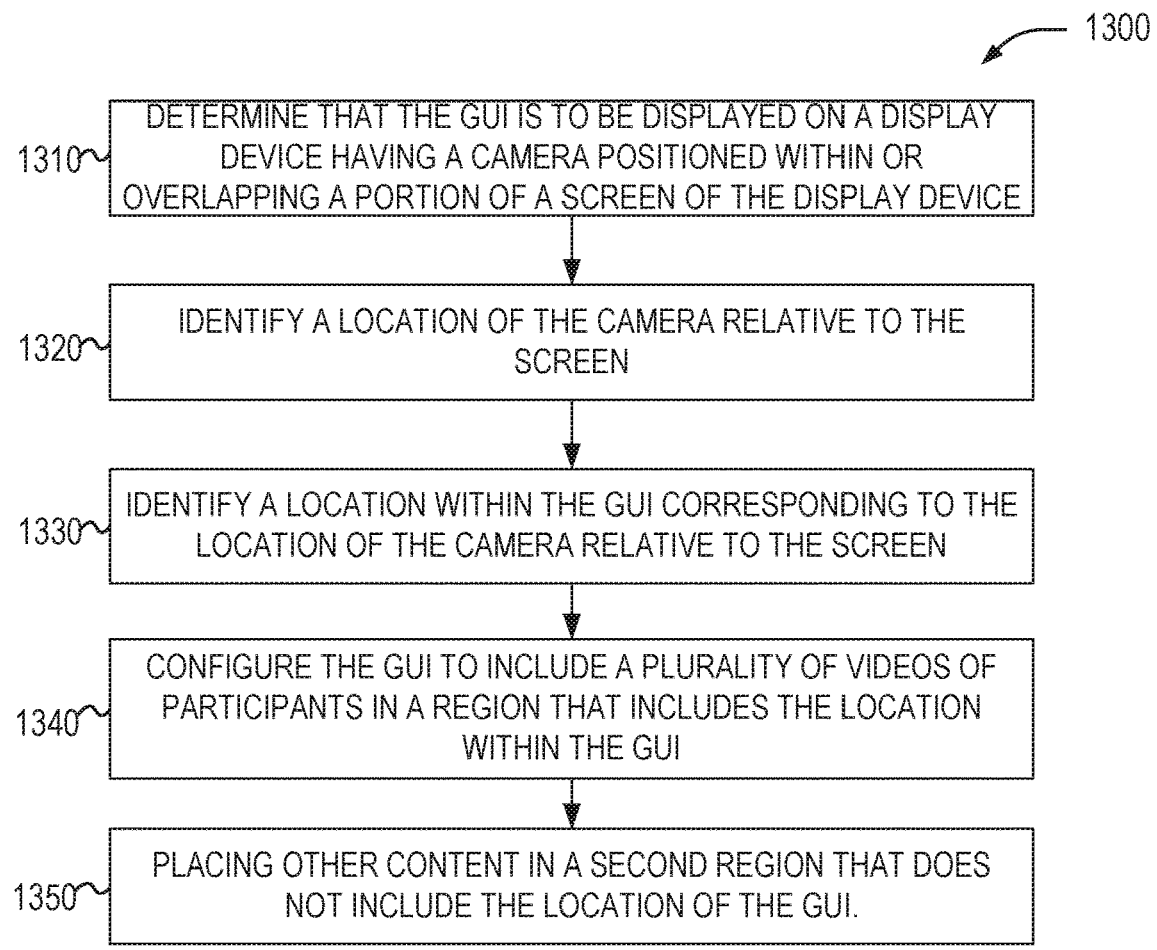
FIG. 13 illustrates a method for configuring a graphical user interface (GUI) of a network-based communication session for display on a display device, the display device having a camera positioned within or overlapping a portion of a screen of the display device occupied by the GUI according to some examples of the present disclosure.

FIG. 13 illustrates a method 1300 for configuring a graphical user interface (GUI) of a network-based communication session for display on a display device, the display device having a camera positioned within or overlapping a portion of a screen of the display device occupied by the GUI according to some examples of the present disclosure. Method 1300 may be performed by one or more of a communication device—such as a computing device of a participant, a meeting room computing device, a server of a communication service (e.g., such as a media server), or the like.

At operation 1310 the system may determine that the GUI of the network-based communication session is to be displayed on a display device having the camera positioned within or overlapping the portion of the screen of the display device occupied by the GUI. For example, the camera may be placed behind a display screen and the display screen may have an aperture. In other examples, the camera may be placed on top of the screen, within the screen, or on an arm extending in front of the screen. In the latter example, the arm may be mounted to a wall, a table, or other structure and may extend in front of the screen.

Operations 1320, 1330, 1340, and 1350 may be performed responsive to determining that the GUI is to be displayed on the display device having the camera positioned within or overlapping the portion of the screen of the display device occupied by the GUI. At operation 1320 the system may identify a location of the camera relative to the screen. For example, by determining an identity of the display, accessing display information (e.g., an EDID or other configuration data), and determining the location based upon information in the display information. The information in the display information may be determined using calibration. For example, an administrator may input the location of the camera relative to the screen. In other examples, a test image may be displayed on the screen and another camera in the room may be used to automatically determine the location of the camera relative to the screen.

At operation 1330, the system may identify a location within the GUI corresponding to the location of the camera relative to the screen. In some examples, this may include correlating the location of the camera relative to the screen to an area within the GUI. That is, to determine the location of the GUI that is impacted, blocked, or within the location of the camera. In some examples, operations 1320 and 1330 may be performed at a same time (e.g., the other camera may determine both based upon the test image). In some examples, the system may use a size of the display along with the position of the camera relative to the display to determine the position of the camera in the GUI.

At operation 1340, the system may configure the GUI to include a plurality of videos of participants in a region that includes the location within the GUI. In some examples, this may be dynamically configured. In other examples, the system may use the display information and the location of the camera to create a template or filter a set of predefined templates such that videos of participants are displayed in the region that includes the location within the GUI. At operation 1350, the system may place other content of the network-based communication session in a second region that does not include the location on the GUI. The other content may be static or semi-static content such as screen sharing, slides, or the like.

Figure 14:
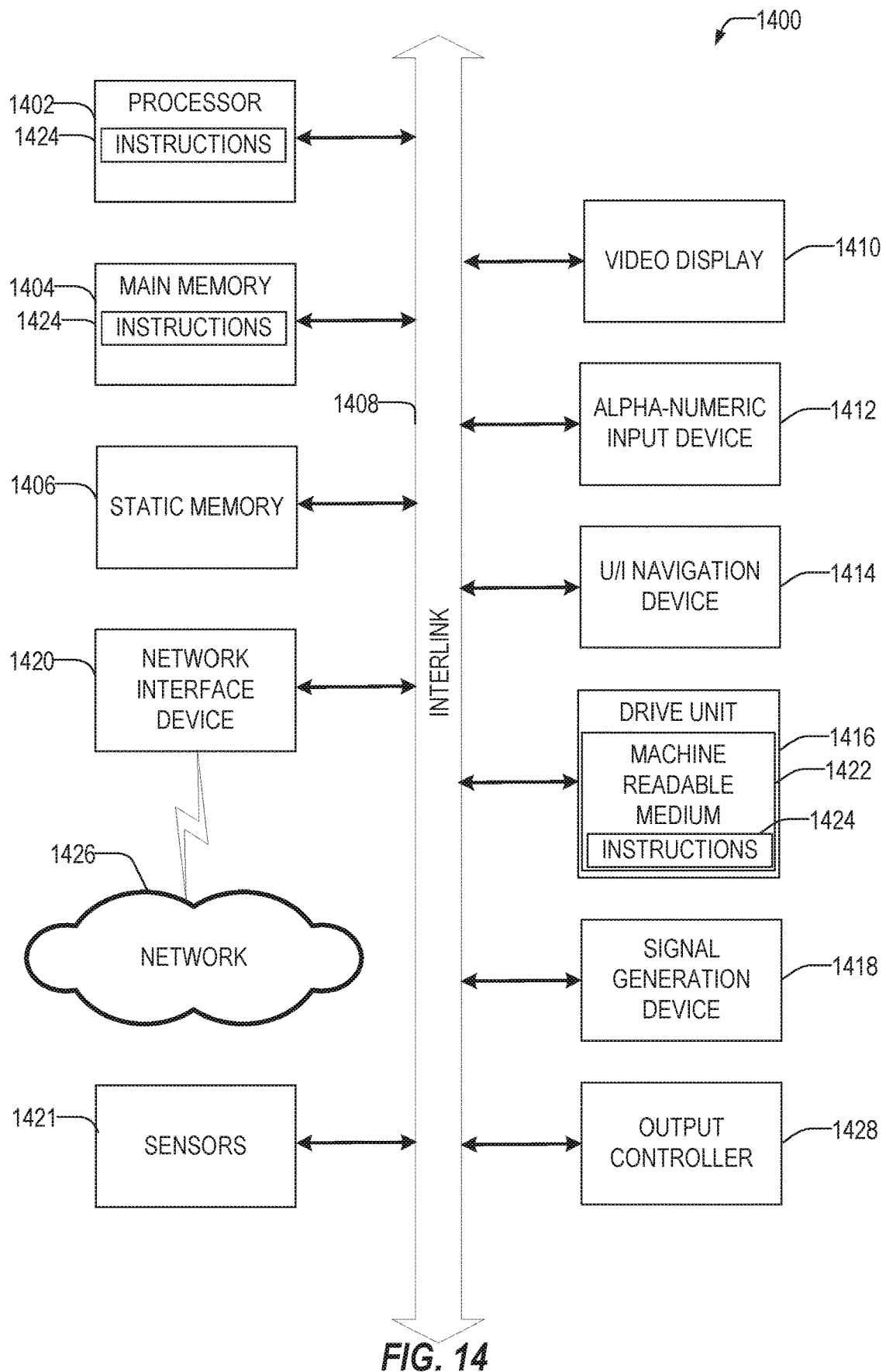
FIG. 14 is a block diagram illustrating an example of a machine upon which one or more embodiments may be implemented according to some examples of the present disclosure.

FIG. 14 illustrates a block diagram of an example machine 1400 upon which any one or more of the techniques (e.g., methodologies) discussed herein may perform. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a server (such as a server of a communication service), personal computer (PC), a tablet PC, a set-top box (STB), a personal digital assistant (PDA), a meeting room system, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Device 1400 may implement any one or more of the systems or devices of FIGS. 1-6, and 9-11; be configured to implement any of FIGS. 7, 8, and 13; be configured to implement the modules of FIG. 12.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1416, a signal generation device 1418 (e.g., a speaker), a network interface device 1420, and one or more sensors 1421, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

While the machine readable medium 1422 is illustrated as a single medium, the term "machine readable medium" may include a single medium or multiple media (e.g., a centralized or distributed database, and/or associated caches and servers) configured to store the one or more instructions 1424.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1424 may further be transmitted or received over a communications network 1426 using a transmission medium via the network interface device 1420. The Machine 1400 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques.

Figure 15:
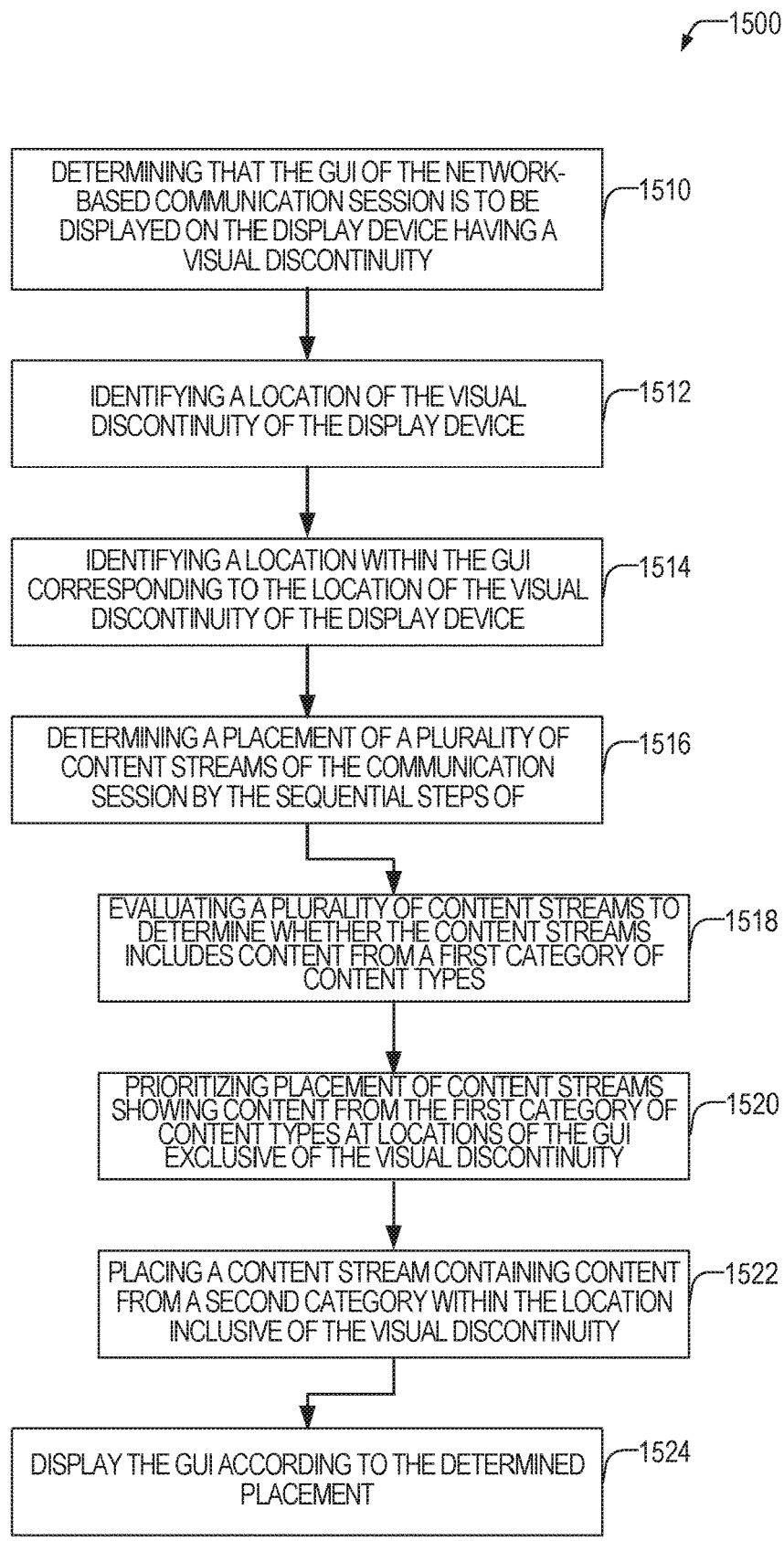
FIG. 15 illustrates a flowchart of a method of minimizing distracting content layout of a graphical user interface of a network-based communication session when the GUI is displayed on a display device having an area of visual discontinuity according to some examples of the present disclosure.

FIG. 15 illustrates a flowchart of a method of minimizing distracting content layout of a graphical user interface of a network-based communication session when the GUI is displayed on a display device having an area of visual discontinuity according to some examples of the present disclosure. In some examples, method 1500 is performed by a communication application, such as a communication application that may provide a network-based communication session such as a network-based meeting, teleconference, or the like. In other examples, method 1500 may be performed by a communication server of a communication service.

At operation 1510, the system may determine that the GUI of the network-based communication session is to be displayed on a display device having a visual discontinuity. The visual discontinuity may be any obstruction, aperture, or defect in the display. For example, a hole for a camera, a camera positioned on a display, a camera positioned so as to obstruct a portion of the display, a defect in the display (e.g., one or more dead or stuck pixels, color defects in the display), a reflection or other bright portion of the display from room lighting, a portion of a display that is not visible, a split or splits in the display surface, or the like.

The application may determine that the GUI is to be displayed on a display device having a visual discontinuity in a number of ways. For example, based upon configuration data of the application. An administrator may specify, e.g., in a configuration dialog, that the GUI is displayed on a display that has a discontinuity. In some examples, the administrator may also specify the location of the discontinuity. In other examples, automated methods may be employed. For example, the system may utilize metadata exchanged with the display, such as EDID data, to learn that the display has a discontinuity and/or the location of the discontinuity. For example, a manufacturer may determine that the display has a discontinuity and the location of the discontinuity. This may then be programmed into the display. In still other examples, the system may determine that the display has a visual discontinuity based upon an image projected onto a display and a camera capturing the display as explained previously.

At operation 1512, the system may identify the location of the visual discontinuity on the display device. As noted previously, the location may be set by a user, during manufacturing, based upon testing, or the like. For example, the location may be embedded in a memory of the display and provided to the computing device the network-based communication session is executing on. The network-based communication session may then access this information. In still yet other examples, the communication application may have a list of displays with visual discontinuities and their locations.

At operation 1514, the communication application may identify the location within the GUI corresponding to the location of the visual discontinuity of the display device. For example, the communication application may determine which portion of the GUI of the communication application is within the area of the discontinuity. That is, the application may translate a display-specific coordinates of the discontinuity determined at 1512 to GUI coordinates. While the display-specific coordinates may be similar to the GUI coordinates, there may be window borders, task bars, and other elements that mean that the coordinates are different. Furthermore, if the application is windowed and is not displayed full screen, the window may be moved around the display. In some examples, the system updates the layout (below) anytime the window is moved or the location of the discontinuity relative to the GUI changes.

At operation 1516, the application determines a placement of a plurality of content streams of the communication session by sequentially performing operations 1518, 1520, and 1522. The communication session may have a plurality of content streams. Examples include screen sharing streams, video streams of participants, application sharing streams, messaging streams, agenda displays, transcription streams, and the like. Content streams may be broken down into two general categories based upon the expected motion within the content. A first category may be static content and a second category may be dynamic content. Static content may be document sharing, application sharing, screen sharing or the like with low expected amounts of motion. For example, the content is of a type that is expected to have less motion over a predetermined period of time than a specified threshold, or less motion relative to dynamic content. For example, little to no motion or movement. Examples include slide shows, presentations, application sharing (e.g., word processing document, spreadsheet file), and the like where minimal motion is expected. While these applications may feature movement of a mouse pointer, periodic changes (e.g., a slide change), a slide transition, or basic animations, the overall motion rate of this content is relatively stationary. The second category of content types may include dynamic content. Dynamic content may be content that is expected to have more motion over the predetermined period of time than the specified threshold. Examples include participant video, shared video, and the like. In some examples, whether content is in the first or second categories (e.g., static or dynamic) may be determined by a predefined list of content sources.

Metadata within the stream may be used to determine the type of content and this may be compared to a list of content types and an indicator of whether the content is in the first or second categories. In other examples, the system may monitor the content and determine an average motion or change in the content (e.g., based upon pixel data) over the predetermined time to determine whether the content is static or dynamic and the positioning of the content may be adjusted as a result. Note that all content streams may be video streams, the motion aspect refers to the actual content displayed. For example, a video of a static object may be considered static content.

At operation 1518, the application may evaluate a plurality of content streams to determine whether the content streams include static streams. As previously described, the application may determine whether the content stream is in the first or second categories based upon metadata in the content or based upon an analysis of the content. At operation 1520, the application may prioritize placement of the content streams showing content from the first category of content types at locations of the GUI exclusive of the visual discontinuity. At operation 1522, the system may place a content stream containing content from a second category of content types within the location inclusive of the visual discontinuity. For example, next to, or within the discontinuity. In some examples, the presence of motion in the streams makes placement of dynamic content within this region less distracting than with static content. At operation 1524, the application may display the GUI according to the determined placement.

As previously noted, the layout may be modified or changed as new streams are added or removed, or as content moves between static or dynamic. That is, the amount of motion of a screen sharing or application sharing application may cross the threshold and the content may be automatically moved to a different location. Also, as previously described the content streams from a first category of content types may be placed at locations of the GUI exclusive of the visual discontinuity and content streams from a second category of content types may be placed at locations of the GUI inclusive of the visual discontinuity. Placement at locations that are inclusive of the visual discontinuity may include placement within an area that is close to the visual discontinuity but not overlapping it (e.g., within a threshold distance) or an area that at least partially overlaps the discontinuity.

Figure 16:
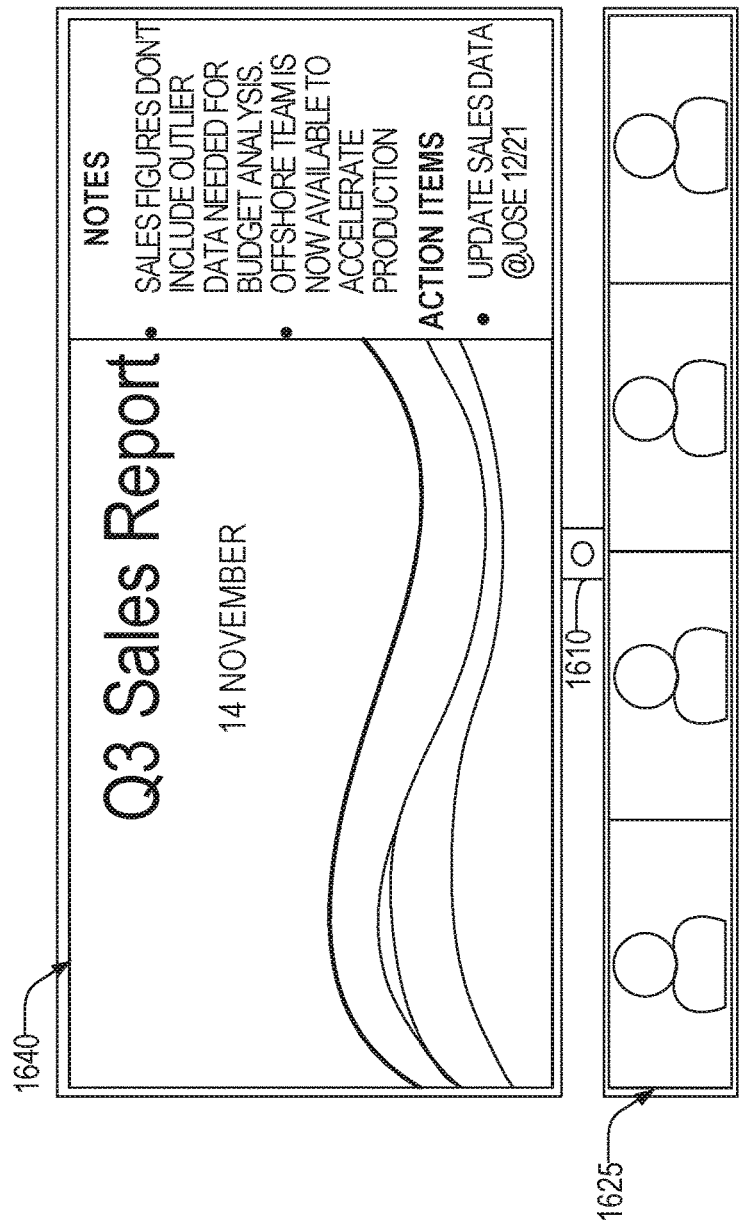
FIG. 16 illustrates another example in-room setup for a communication session with a display according to some examples of the present disclosure.

FIG. 16 illustrates another example in-room setup 1600 for a communication session with a display according to some examples of the present disclosure. The in-room setup 1600 illustrates another example visual discontinuity which may be a split or splits in the display surface and/or GUI. For example the display may have an upper portion 1640, and a lower portion 1625 separated by a camera 1610. Upper portion 1640 may display some types of content, and lower portion 1625 may display other types of content. In some examples, static content may be displayed in the upper portion 1640 and dynamic content may be displayed in the lower portion 1625.

Other Notes and Examples

Example 1 is a method for configuring a graphical user interface (GUI) of a network-based communication session for display on a display device having an aperture within the display, the method comprising: determining that the GUI of the network-based communication is to be displayed on a display device having an aperture within the display; responsive to the determining that the GUI is to be displayed on the display device having an aperture within the display: identifying a location of the aperture; identifying a first display region that is exclusive of a position of the aperture and a second display region that is inclusive of the position of the aperture, the first and second display regions non-overlapping; identifying a set of one or more permissible content types of the network-based communication for display on the second display region; selecting first content of the network-based communication session for display in the first display region based upon the first content being a first content type that is not within the set of one or more permissible content types; selecting second content of the network-based communication session for display in the second display region based upon the second content being a second content type that is in the set of one or more permissible content types; and displaying the first content in the first display region and the second content in the second display region.

In Example 2, the subject matter of Example 1 includes, wherein identifying the first display region and the second display region comprises identifying a defined template.

In Example 3, the subject matter of Example 2 includes, wherein the defined template is identified from a set of one or more valid templates based upon a size of the display and a position of the aperture within the display.

In Example 4, the subject matter of Examples 1-3 includes, wherein identifying the position of the aperture within the display comprises accessing metadata about the display.

In Example 5, the subject matter of Examples 1-4 includes, wherein the set of one or more permissible content types includes video content.

In Example 6, the subject matter of Example 5 includes, wherein the video content includes participant video captured by participant video camera.

In Example 7, the subject matter of Example 6 includes, wherein the participant video is placed at a position of the aperture such that the position of the aperture overlaps at least one pixel of the participant video.

In Example 8, the subject matter of Example 7 includes, wherein the participant video is a participant that is currently speaking.

In Example 9, the subject matter of Examples 1-8 includes, wherein the set of one or more permissible content types does not include static content.

In Example 10, the subject matter of Example 9 includes, wherein the static content includes screen sharing, application sharing, or chat messaging content.

In Example 11, the subject matter of Examples 1-10 includes, wherein the display comprises a video screen with the aperture, a projector, and a camera; and wherein the camera is mounted so that light enters a lens of the camera through the aperture in the video screen.

In Example 12, the subject matter of Example 11 includes, wherein the camera is positioned at a location to capture an eye level of individuals within a conference room in which it is mounted.

In Example 13, the subject matter of Examples 1-12 includes, wherein the network-based communication is a network-based meeting with a plurality of participants.

In Example 14, the subject matter of Examples 1-13 includes, wherein the first and second display regions are adjacent.

In Example 15, the subject matter of Examples 1-14 includes, wherein a camera is positioned so that light enters a lens of the camera through the aperture in the display.

In Example 16, the subject matter of Examples 1-15 includes, wherein displaying the second content in the second display region comprises: identifying the position of the aperture within the GUI; and not displaying the second content at the position of the aperture within the GUI.

In Example 17, the subject matter of Example 16 includes, wherein not displaying the second content at the position of the aperture within the GUI comprises displaying a video of a participant of the network-based communication session at and around the position of the aperture with pixels corresponding to the position of the aperture being blacked out.

In Example 18, the subject matter of Examples 1-17 includes, wherein the second content type comprises a plurality of participant videos of a plurality of participants captured by cameras of the plurality of participants, and wherein the method further comprises: detecting a location of an eye level of each of the plurality of participants; and aligning the eye level of the plurality of videos of the plurality of participants with a preset location.

In Example 19, the subject matter of Example 18 includes, wherein the preset location is a location of a camera coupled to the display.

Example 20 is a device for configuring a graphical user interface (GUI) of a network-based communication session for display on a display device having an aperture within the display, the device comprising: a processor; a memory, the memory storing instructions, which when executed by the processor, cause the processor to perform operations comprising: determining that the GUI of the network-based communication is to be displayed on a display device having an aperture within the display; responsive to the determining that the GUI is to be displayed on the display device having an aperture within the display: identifying a location of the aperture; identifying a first display region that is exclusive of a position of the aperture and a second display region that is inclusive of the position of the aperture, the first and second display regions non-overlapping; identifying a set of one or more permissible content types of the network-based communication for display on the second display region; selecting first content of the network-based communication session for display in the first display region based upon the first content being a first content type that is not within the set of one or more permissible content types; selecting second content of the network-based communication session for display in the second display region based upon the second content being a second content type that is in the set of one or more permissible content types; and displaying the first content in the first display region and the second content in the second display region.

In Example 21, the subject matter of Example 20 includes, wherein the operations of identifying the first display region and the second display region comprises identifying a defined template.

In Example 22, the subject matter of Example 21 includes, wherein the defined template is identified from a set of one or more valid templates based upon a size of the display and a position of the aperture within the display.

In Example 23, the subject matter of Examples 20-22 includes, wherein the operations of identifying the position of the aperture within the display comprises accessing metadata about the display.

In Example 24, the subject matter of Examples 20-23 includes, wherein the set of one or more permissible content types includes video content.

In Example 25, the subject matter of Example 24 includes, wherein the video content includes participant video captured by participant video camera.

In Example 26, the subject matter of Example 25 includes, wherein the participant video is placed at a position of the aperture such that the position of the aperture overlaps at least one pixel of the participant video.

In Example 27, the subject matter of Example 26 includes, wherein the participant video is a participant that is currently speaking.

In Example 28, the subject matter of Examples 20-27 includes, wherein the set of one or more permissible content types does not include static content.

In Example 29, the subject matter of Example 28 includes, wherein the static content includes screen sharing, application sharing, or chat messaging content.

In Example 30, the subject matter of Examples 20-29 includes, wherein the display comprises a video screen with the aperture, a projector, and a camera; and wherein the camera is mounted so that light enters a lens of the camera through the aperture in the video screen.

In Example 31, the subject matter of Example 30 includes, wherein the camera is positioned at a location to capture an eye level of individuals within a conference room in which it is mounted.

In Example 32, the subject matter of Examples 20-31 includes, wherein the network-based communication is a network-based meeting with a plurality of participants.

In Example 33, the subject matter of Examples 20-32 includes, wherein the first and second display regions are adjacent.

In Example 34, the subject matter of Examples 20-33 includes, wherein a camera is positioned so that light enters a lens of the camera through the aperture in the display.

In Example 35, the subject matter of Examples 20-34 includes, wherein the operations of displaying the second content in the second display region comprises: identifying the position of the aperture within the GUI; and not displaying the second content at the position of the aperture within the GUI.

In Example 36, the subject matter of Example 35 includes, wherein the operations of not displaying the second content at the position of the aperture within the GUI comprises displaying a video of a participant of the network-based communication session at and around the position of the aperture with pixels corresponding to the position of the aperture being blacked out.

In Example 37, the subject matter of Examples 20-36 includes, wherein the second content type comprises a plurality of participant videos of a plurality of participants captured by cameras of the plurality of participants, and wherein the operations further comprise: detecting a location of an eye level of each of the plurality of participants; and aligning the eye level of the plurality of videos of the plurality of participants with a preset location.

In Example 38, the subject matter of Example 37 includes, wherein the preset location is a location of a camera coupled to the display.

Example 39 is a machine-readable medium, storing instructions for configuring a graphical user interface (GUI) of a network-based communication session for display on a display device having an aperture within the display, the instructions, when executed, cause the machine to perform operations comprising: determining that the GUI of the network-based communication is to be displayed on a display device having an aperture within the display; responsive to the determining that the GUI is to be displayed on the display device having an aperture within the display: identifying a location of the aperture; identifying a first display region that is exclusive of a position of the aperture and a second display region that is inclusive of the position of the aperture, the first and second display regions non-overlapping; identifying a set of one or more permissible content types of the network-based communication for display on the second display region; selecting first content of the network-based communication session for display in the first display region based upon the first content being a first content type that is not within the set of one or more permissible content types; selecting second content of the network-based communication session for display in the second display region based upon the second content being a second content type that is in the set of one or more permissible content types; and displaying the first content in the first display region and the second content in the second display region.

In Example 40, the subject matter of Example 39 includes, wherein the operations of identifying the first display region and the second display region comprises identifying a defined template.

In Example 41, the subject matter of Example 40 includes, wherein the defined template is identified from a set of one or more valid templates based upon a size of the display and a position of the aperture within the display.

In Example 42, the subject matter of Examples 39-41 includes, wherein the operations of identifying the position of the aperture within the display comprises accessing metadata about the display.

In Example 43, the subject matter of Examples 39-42 includes, wherein the set of one or more permissible content types includes video content.

In Example 44, the subject matter of Example 43 includes, wherein the video content includes participant video captured by participant video camera.

In Example 45, the subject matter of Example 44 includes, wherein the participant video is placed at a position of the aperture such that the position of the aperture overlaps at least one pixel of the participant video.

In Example 46, the subject matter of Example 45 includes, wherein the participant video is a participant that is currently speaking.

In Example 47, the subject matter of Examples 39-46 includes, wherein the set of one or more permissible content types does not include static content.

In Example 48, the subject matter of Example 47 includes, wherein the static content includes screen sharing, application sharing, or chat messaging content.

In Example 49, the subject matter of Examples 39-48 includes, wherein the display comprises a video screen with the aperture, a projector, and a camera; and wherein the camera is mounted so that light enters a lens of the camera through the aperture in the video screen.

In Example 50, the subject matter of Example 49 includes, wherein the camera is positioned at a location to capture an eye level of individuals within a conference room in which it is mounted.

In Example 51, the subject matter of Examples 39-50 includes, wherein the network-based communication is a network-based meeting with a plurality of participants.

In Example 52, the subject matter of Examples 39-51 includes, wherein the first and second display regions are adjacent.

In Example 53, the subject matter of Examples 39-52 includes, wherein a camera is positioned so that light enters a lens of the camera through the aperture in the display.

In Example 54, the subject matter of Examples 39-53 includes, wherein the operations of displaying the second content in the second display region comprises: identifying the position of the aperture within the GUI; and not displaying the second content at the position of the aperture within the GUI.

In Example 55, the subject matter of Example 54 includes, wherein the operations of not displaying the second content at the position of the aperture within the GUI comprises displaying a video of a participant of the network-based communication session at and around the position of the aperture with pixels corresponding to the position of the aperture being blacked out.

In Example 56, the subject matter of Examples 39-55 includes, wherein the second content type comprises a plurality of participant videos of a plurality of participants captured by cameras of the plurality of participants, and wherein the operations further comprise: detecting a location of an eye level of each of the plurality of participants; and aligning the eye level of the plurality of videos of the plurality of participants with a preset location.

In Example 57, the subject matter of Example 56 includes, wherein the preset location is a location of a camera coupled to the display.

Example 58 is a device for configuring a graphical user interface (GUI) of a network-based communication session for display on a display device having an aperture within the display, the device comprising: means for determining that the GUI of the network-based communication is to be displayed on a display device having an aperture within the display; responsive to the determining that the GUI is to be displayed on the display device having an aperture within the display: means for identifying a location of the aperture; means for identifying a first display region that is exclusive of a position of the aperture and a second display region that is inclusive of the position of the aperture, the first and second display regions non-overlapping; means for identifying a set of one or more permissible content types of the network-based communication for display on the second display region; means for selecting first content of the network-based communication session for display in the first display region based upon the first content being a first content type that is not within the set of one or more permissible content types; means for selecting second content of the network-based communication session for display in the second display region based upon the second content being a second content type that is in the set of one or more permissible content types; and means for displaying the first content in the first display region and the second content in the second display region.

In Example 59, the subject matter of Example 58 includes, wherein the means for identifying the first display region and the second display region comprises means for identifying a defined template.

In Example 60, the subject matter of Example 59 includes, wherein the defined template is identified from a set of one or more valid templates based upon a size of the display and a position of the aperture within the display.

In Example 61, the subject matter of Examples 58-60 includes, wherein the means for identifying the position of the aperture within the display comprises accessing metadata about the display.

In Example 62, the subject matter of Examples 58-61 includes, wherein the set of one or more permissible content types includes video content.

In Example 63, the subject matter of Example 62 includes, wherein the video content includes participant video captured by participant video camera.

In Example 64, the subject matter of Example 63 includes, wherein the participant video is placed at a position of the aperture such that the position of the aperture overlaps at least one pixel of the participant video.

In Example 65, the subject matter of Example 64 includes, wherein the participant video is a participant that is currently speaking.

In Example 66, the subject matter of Examples 58-65 includes, wherein the set of one or more permissible content types does not include static content.

In Example 67, the subject matter of Example 66 includes, wherein the static content includes screen sharing, application sharing, or chat messaging content.

In Example 68, the subject matter of Examples 58-67 includes, wherein the display comprises a video screen with the aperture, a projector, and a camera; and wherein the camera is mounted so that light enters a lens of the camera through the aperture in the video screen.

In Example 69, the subject matter of Example 68 includes, wherein the camera is positioned at a location to capture an eye level of individuals within a conference room in which it is mounted.

In Example 70, the subject matter of Examples 58-69 includes, wherein the network-based communication is a network-based meeting with a plurality of participants.

In Example 71, the subject matter of Examples 58-70 includes, wherein the first and second display regions are adjacent.

In Example 72, the subject matter of Examples 58-71 includes, wherein a camera is positioned so that light enters a lens of the camera through the aperture in the display.

In Example 73, the subject matter of Examples 58-72 includes, wherein the means for displaying the second content in the second display region comprises: means for identifying the position of the aperture within the GUI; and means for not displaying the second content at the position of the aperture within the GUI.

In Example 74, the subject matter of Example 73 includes, wherein the means for not displaying the second content at the position of the aperture within the GUI comprises means for displaying a video of a participant of the network-based communication session at and around the position of the aperture with pixels corresponding to the position of the aperture being blacked out.

In Example 75, the subject matter of Examples 58-74 includes, wherein the second content type comprises a plurality of participant videos of a plurality of participants captured by cameras of the plurality of participants, and wherein the device further comprises: means for detecting a location of an eye level of each of the plurality of participants; and means for aligning the eye level of the plurality of videos of the plurality of participants with a preset location.

In Example 76, the subject matter of Example 75 includes, wherein the preset location is a location of a camera coupled to the display.

Example 77 is a method for configuring a graphical user interface (GUI) of a network-based communication to modify characteristics of a plurality of participant video streams based upon detected body positions in the plurality of participant video streams, the method comprising: receiving a first video showing a first participant in a network-based communication; identifying a body part of the first participant in the first video; receiving a second video showing a second participant in the network-based communication; identifying a body part of the second participant in the second video; modifying images of one or more of the first participant in the first video or the second participant in the second video to normalize one or more characteristics of the body part of the first participant and the body part of the second participant, the normalizing making the one or more characteristics of the body part of the first participant and the body part of the second participant consistent; and displaying the modified first and second video in the GUI as part of the network-based communication.

In Example 78, the subject matter of Example 77 includes, wherein the body part comprises eyes, and wherein modifying images of one or more of the first participant in the first video or the second participant in the second video to normalize one or more characteristics of the body part of the first participant and the body part of the second participant comprises modifying images of one or more of the first participant in the first video or the second participant in the second video such that eyes of the first participant and eyes of the second participant are displayed at a same size, height, or orientation.

In Example 79, the subject matter of Examples 77-78 includes, wherein the identifying the first body part, the second body part, and modifying the images is performed periodically on successive video frames of the first and second videos.

In Example 80, the subject matter of Examples 77-79 includes, wherein the body part comprises eyes, and wherein the method further comprises: detecting a position of eyes of a third participant, the third participant viewing the GUI, the detecting the position of eyes performed based upon images of the third participant captured by a camera communicatively coupled to a computing device displaying the GUI; selecting one of a vertical or horizontal location on a display for displaying the first and second video in the GUI based upon a detected position of eyes of the third participant, the vertical or horizontal location selected to place the first and second video such that detected eyes of the first and second participants are within a predetermined vertical or horizontal distance from the eyes of the third participant; and displaying the modified first and second video in the GUI at the vertical or horizontal location on the display.

Example 81 is a device for configuring a graphical user interface (GUI) of a network-based communication to modify characteristics of a plurality of participant video streams based upon detected body positions in the plurality of participant video streams, the device comprising: a processor; a memory, the memory storing instructions, which when executed by the processor, cause the processor to perform operations comprising: receiving a first video showing a first participant in a network-based communication; identifying a body part of the first participant in the first video; receiving a second video showing a second participant in the network-based communication; identifying a body part of the second participant in the second video; modifying images of one or more of the first participant in the first video or the second participant in the second video to normalize one or more characteristics of the body part of the first participant and the body part of the second participant, the normalizing making the one or more characteristics of the body part of the first participant and the body part of the second participant consistent; and displaying the modified first and second video in the GUI as part of the network-based communication.

In Example 82, the subject matter of Example 81 includes, wherein the body part comprises eyes, and wherein the operations of modifying images of one or more of the first participant in the first video or the second participant in the second video to normalize one or more characteristics of the body part of the first participant and the body part of the second participant comprises modifying images of one or more of the first participant in the first video or the second participant in the second video such that eyes of the first participant and eyes of the second participant are displayed at a same size, height, or orientation.

In Example 83, the subject matter of Examples 81-82 includes, wherein the operations of identifying the first body part, the second body part, and modifying the images is performed periodically on successive video frames of the first and second videos.

In Example 84, the subject matter of Examples 81-83 includes, wherein the body part comprises eyes, and wherein the operations further comprise: detecting a position of eyes of a third participant, the third participant viewing the GUI, the detecting the position of eyes performed based upon images of the third participant captured by a camera communicatively coupled to a computing device displaying the GUI; selecting one of a vertical or horizontal location on a display for displaying the first and second video in the GUI based upon a detected position of eyes of the third participant, the vertical or horizontal location selected to place the first and second video such that detected eyes of the first and second participants are within a predetermined vertical or horizontal distance from the eyes of the third participant; and displaying the modified first and second video in the GUI at the vertical or horizontal location on the display.

Example 85 is a machine-readable medium, storing instructions for configuring a graphical user interface (GUI) of a network-based communication to modify characteristics of a plurality of participant video streams based upon detected body positions in the plurality of participant video streams, the instructions, when executed by a machine, cause the machine to perform operations comprising: receiving a first video showing a first participant in a network-based communication; identifying a body part of the first participant in the first video; receiving a second video showing a second participant in the network-based communication; identifying a body part of the second participant in the second video; modifying images of one or more of the first participant in the first video or the second participant in the second video to normalize one or more characteristics of the body part of the first participant and the body part of the second participant, the normalizing making the one or more characteristics of the body part of the first participant and the body part of the second participant consistent; and displaying the modified first and second video in the GUI as part of the network-based communication.

In Example 86, the subject matter of Example 85 includes, wherein the body part comprises eyes, and wherein the operations of modifying images of one or more of the first participant in the first video or the second participant in the second video to normalize one or more characteristics of the body part of the first participant and the body part of the second participant comprises modifying images of one or more of the first participant in the first video or the second participant in the second video such that eyes of the first participant and eyes of the second participant are displayed at a same size, height, or orientation.

In Example 87, the subject matter of Examples 85-86 includes, wherein the operations of identifying the first body part, the second body part, and modifying the images is performed periodically on successive video frames of the first and second videos.

In Example 88, the subject matter of Examples 85-87 includes, wherein the body part comprises eyes, and wherein the operations further comprise: detecting a position of eyes of a third participant, the third participant viewing the GUI, the detecting the position of eyes performed based upon images of the third participant captured by a camera communicatively coupled to a computing device displaying the GUI; selecting one of a vertical or horizontal location on a display for displaying the first and second video in the GUI based upon a detected position of eyes of the third participant, the vertical or horizontal location selected to place the first and second video such that detected eyes of the first and second participants are within a predetermined vertical or horizontal distance from the eyes of the third participant; and displaying the modified first and second video in the GUI at the vertical or horizontal location on the display.

Example 89 is a device for configuring a graphical user interface (GUI) of a network-based communication to modify characteristics of a plurality of participant video streams based upon detected body positions in the plurality of participant video streams, the method comprising: means for receiving a first video showing a first participant in a network-based communication; means for identifying a body part of the first participant in the first video; means for receiving a second video showing a second participant in the network-based communication; means for identifying a body part of the second participant in the second video; means for modifying images of one or more of the first participant in the first video or the second participant in the second video to normalize one or more characteristics of the body part of the first participant and the body part of the second participant, the normalizing making the one or more characteristics of the body part of the first participant and the body part of the second participant consistent; and means for displaying the modified first and second video in the GUI as part of the network-based communication.

In Example 90, the subject matter of Example 89 includes, wherein the body part comprises eyes, and wherein the means for modifying images of one or more of the first participant in the first video or the second participant in the second video to normalize one or more characteristics of the body part of the first participant and the body part of the second participant comprises means for modifying images of one or more of the first participant in the first video or the second participant in the second video such that eyes of the first participant and eyes of the second participant are displayed at a same size, height, or orientation.

In Example 91, the subject matter of Examples 89-90 includes, wherein the means for identifying the first body part, the second body part, and modifying the images is performed periodically on successive video frames of the first and second videos.

In Example 92, the subject matter of Examples 89-91 includes, wherein the body part comprises eyes, and wherein the device further comprises: means for detecting a position of eyes of a third participant, the third participant viewing the GUI, the detecting the position of eyes performed based upon images of the third participant captured by a camera communicatively coupled to a computing device displaying the GUI; means for selecting one of a vertical or horizontal location on a display for displaying the first and second video in the GUI based upon a detected position of eyes of the third participant, the vertical or horizontal location selected to place the first and second video such that detected eyes of the first and second participants are within a predetermined vertical or horizontal distance from the eyes of the third participant; and means for displaying the modified first and second video in the GUI at the vertical or horizontal location on the display.

Example 93 is a method for configuring a graphical user interface (GUI) of a network-based communication session for display on a display device, the display device having a camera positioned within or overlapping a portion of a screen of the display device occupied by the GUI, the method comprising: determining that the GUI of the network-based communication session is to be displayed on the display device having the camera positioned within or overlapping the portion of the screen of the display device occupied by the GUI; responsive to the determining that the GUI is to be displayed on the display device having the camera positioned within or overlapping the portion of the screen of the display device occupied by the GUI: identifying a location of the camera relative to the screen; identifying a location within the GUI corresponding to the location of the camera relative to the screen; configuring the GUI to include, a plurality of videos of participants in a region that includes the location within the GUI; and placing other content of the network-based communication session in a second region that does not include the location on the GUI.

In Example 94, the subject matter of Example 93 includes, identifying an eye level of a first participant from a first video of the plurality of videos of participants; identifying an eye level of a second participant from a second video of the plurality of videos of participants; and wherein configuring the GUI to include the plurality of videos of participants comprises aligning the eye level of the first participant and the second participant with a determined location.

In Example 95, the subject matter of Example 94 includes, wherein the determined location is an eye level of a third participant, the eye level of the third participant determined using video from the camera positioned within or overlapping the portion of the screen of the display device.

In Example 96, the subject matter of Examples 93-95 includes, wherein the camera is mounted behind the screen and receives light through an aperture in the screen.

In Example 97, the subject matter of Examples 93-96 includes, wherein the camera is mounted to an arm extending in front of the screen.

In Example 98, the subject matter of Examples 93-97 includes, wherein configuring the GUI to include the plurality of videos of participants in the region including the location of the camera comprises inserting black pixels at the location of the camera within the GUI.

In Example 99, the subject matter of Examples 93-98 includes, wherein the location of the camera is configured by a user.

In Example 100, the subject matter of Examples 93-99 includes, wherein identifying the location of the camera relative to the screen comprises: determining an identity of the display; accessing a display information data structure; and determining the location of the camera relative to the screen from the display information data structure.

In Example 101, the subject matter of Examples 93-100 includes, wherein configuring the GUI to include the plurality of videos of participants in the region that includes the location within the GUI comprises placing a first video of the plurality of videos of participants at the location within the GUI.

In Example 102, the subject matter of Examples 93-101 includes, wherein the other content is screen sharing content.

In Example 103, the subject matter of Examples 93-102 includes, wherein the camera is mounted at an eye level of one or more participants viewing the display screen.

Example 104 is a device for configuring a graphical user interface (GUI) of a network-based communication session for display on a display device, the display device having a camera positioned within or overlapping a portion of a screen of the display device occupied by the GUI, the device comprising: a processor; a memory, the memory storing instructions, which when executed by the processor, cause the device to perform operations comprising: determining that the GUI of the network-based communication session is to be displayed on the display device having the camera positioned within or overlapping the portion of the screen of the display device occupied by the GUI; responsive to the determining that the GUI is to be displayed on the display device having the camera positioned within or overlapping the portion of the screen of the display device occupied by the GUI: identifying a location of the camera relative to the screen; identifying a location within the GUI corresponding to the location of the camera relative to the screen; configuring the GUI to include, a plurality of videos of participants in a region that includes the location within the GUI; and placing other content of the network-based communication session in a second region that does not include the location on the GUI.

In Example 105, the subject matter of Example 104 includes, wherein the operations further comprise: identifying an eye level of a first participant from a first video of the plurality of videos of participants; identifying an eye level of a second participant from a second video of the plurality of videos of participants; and wherein configuring the GUI to include the plurality of videos of participants comprises aligning the eye level of the first participant and the second participant with a determined location.

In Example 106, the subject matter of Example 105 includes, wherein the determined location is an eye level of a third participant, the eye level of the third participant determined using video from the camera positioned within or overlapping the portion of the screen of the display device.

In Example 107, the subject matter of Examples 104-106 includes, wherein the camera is mounted behind the screen and receives light through an aperture in the screen.

In Example 108, the subject matter of Examples 104-107 includes, wherein the camera is mounted to an arm extending in front of the screen.

In Example 109, the subject matter of Examples 104-108 includes, wherein the operations of configuring the GUI to include the plurality of videos of participants in the region including the location of the camera comprises inserting black pixels at the location of the camera within the GUI.

In Example 110, the subject matter of Examples 104-109 includes, wherein the location of the camera is configured by a user.

In Example 111, the subject matter of Examples 104-110 includes, wherein the operations of identifying the location of the camera relative to the screen comprises: determining an identity of the display; accessing a display information data structure; and determining the location of the camera relative to the screen from the display information data structure.

In Example 112, the subject matter of Examples 104-111 includes, wherein the operations of configuring the GUI to include the plurality of videos of participants in the region that includes the location within the GUI comprises placing a first video of the plurality of videos of participants at the location within the GUI.

In Example 113, the subject matter of Examples 104-112 includes, wherein the other content is screen sharing content.

In Example 114, the subject matter of Examples 104-113 includes, wherein the camera is mounted at an eye level of one or more participants viewing the display screen.

Example 115 is a machine-readable medium storing instructions for configuring a graphical user interface (GUI) of a network-based communication session for display on a display device, the display device having a camera positioned within or overlapping a portion of a screen of the display device occupied by the GUI, the instructions, when executed by a machine, cause the machine to perform operations comprising: determining that the GUI of the network-based communication session is to be displayed on the display device having the camera positioned within or overlapping the portion of the screen of the display device occupied by the GUI; responsive to the determining that the GUI is to be displayed on the display device having the camera positioned within or overlapping the portion of the screen of the display device occupied by the GUI: identifying a location of the camera relative to the screen; identifying a location within the GUI corresponding to the location of the camera relative to the screen; configuring the GUI to include, a plurality of videos of participants in a region that includes the location within the GUI; and placing other content of the network-based communication session in a second region that does not include the location on the GUI.

In Example 116, the subject matter of Example 115 includes, wherein the operations further comprise: identifying an eye level of a first participant from a first video of the plurality of videos of participants; identifying an eye level of a second participant from a second video of the plurality of videos of participants; and wherein configuring the GUI to include the plurality of videos of participants comprises aligning the eye level of the first participant and the second participant with a determined location.

In Example 117, the subject matter of Example 116 includes, wherein the determined location is an eye level of a third participant, the eye level of the third participant determined using video from the camera positioned within or overlapping the portion of the screen of the display device.

In Example 118, the subject matter of Examples 115-117 includes, wherein the camera is mounted behind the screen and receives light through an aperture in the screen.

In Example 119, the subject matter of Examples 115-118 includes, wherein the camera is mounted to an arm extending in front of the screen.

In Example 120, the subject matter of Examples 115-119 includes, wherein the operations of configuring the GUI to include the plurality of videos of participants in the region including the location of the camera comprises inserting black pixels at the location of the camera within the GUI.

In Example 121, the subject matter of Examples 115-120 includes, wherein the location of the camera is configured by a user.

In Example 122, the subject matter of Examples 115-121 includes, wherein the operations of identifying the location of the camera relative to the screen comprises: determining an identity of the display; accessing a display information data structure; and determining the location of the camera relative to the screen from the display information data structure.

In Example 123, the subject matter of Examples 115-122 includes, wherein the operations of configuring the GUI to include the plurality of videos of participants in the region that includes the location within the GUI comprises placing a first video of the plurality of videos of participants at the location within the GUI.

In Example 124, the subject matter of Examples 115-123 includes, wherein the other content is screen sharing content.

In Example 125, the subject matter of Examples 115-124 includes, wherein the camera is mounted at an eye level of one or more participants viewing the display screen.

Example 126 is a device for configuring a graphical user interface (GUI) of a network-based communication session for display on a display device, the display device having a camera positioned within or overlapping a portion of a screen of the display device occupied by the GUI, the device comprising: means for determining that the GUI of the network-based communication session is to be displayed on the display device having the camera positioned within or overlapping the portion of the screen of the display device occupied by the GUI; responsive to the determining that the GUI is to be displayed on the display device having the camera positioned within or overlapping the portion of the screen of the display device occupied by the GUI: means for identifying a location of the camera relative to the screen; means for identifying a location within the GUI corresponding to the location of the camera relative to the screen; means for configuring the GUI to include, a plurality of videos of participants in a region that includes the location within the GUI; and means for placing other content of the network-based communication session in a second region that does not include the location on the GUI.

In Example 127, the subject matter of Example 126 includes, means for identifying an eye level of a first participant from a first video of the plurality of videos of participants; means for identifying an eye level of a second participant from a second video of the plurality of videos of participants; and wherein the means for configuring the GUI to include the plurality of videos of participants comprises means for aligning the eye level of the first participant and the second participant with a determined location.

In Example 128, the subject matter of Example 127 includes, wherein the determined location is an eye level of a third participant, the eye level of the third participant determined using video from the camera positioned within or overlapping the portion of the screen of the display device.

In Example 129, the subject matter of Examples 126-128 includes, wherein the camera is mounted behind the screen and receives light through an aperture in the screen.

In Example 130, the subject matter of Examples 126-129 includes, wherein the camera is mounted to an arm extending in front of the screen.

In Example 131, the subject matter of Examples 126-130 includes, wherein the means for configuring the GUI to include the plurality of videos of participants in the region including the location of the camera comprises means for inserting black pixels at the location of the camera within the GUI.

In Example 132, the subject matter of Examples 126-131 includes, wherein the location of the camera is configured by a user.

In Example 133, the subject matter of Examples 126-132 includes, wherein the means for identifying the location of the camera relative to the screen comprises: means for determining an identity of the display; means for accessing a display information data structure; and means for determining the location of the camera relative to the screen from the display information data structure.

In Example 134, the subject matter of Examples 126-133 includes, wherein the means for configuring the GUI to include the plurality of videos of participants in the region that includes the location within the GUI comprises means for placing a first video of the plurality of videos of participants at the location within the GUI.

In Example 135, the subject matter of Examples 126-134 includes, wherein the other content is screen sharing content.

In Example 136, the subject matter of Examples 126-135 includes, wherein the camera is mounted at an eye level of one or more participants viewing the display screen.

Example 137 is a computing device for minimizing distracting content layout of a graphical user interface (GUI) of a network-based communication session when that GUI is displayed on a display device having an area of visual discontinuity, the computing device comprising: a hardware processor; a memory, the memory storing instructions, which when executed, causes the hardware processor to perform operations comprising: determining that the GUI of a network-based communication session is to be displayed on the display device having the area of visual discontinuity; responsive to the determining that the GUI is to be displayed on the display device having the area of visual discontinuity:

identifying a location of the visual discontinuity of the display device; identifying a location within the GUI corresponding to the location of the visual discontinuity of the display device; determining a placement of a plurality of content streams of the network-based communication session in the GUI by the sequential steps of: evaluating the plurality of content streams to determine whether the content streams include, content from a first category of content types, the first category of content types comprising one or more of document, application, or screen sharing content; responsive to determining that the content streams include content from the first category of content types, prioritizing placement of content streams showing content from the first category of content types at locations of the GUI exclusive of the visual discontinuity; and placing a content stream containing content from a second category of content types within the location inclusive of the visual discontinuity, the second category of content types comprising video content; and displaying the GUI according to the determined placement.

In Example 138, the subject matter of Example 137 includes, wherein the plurality of content streams comprises a first video and a second video, wherein the operations further comprise: identifying an eye level of a first participant from the first video; identifying an eye level of a second participant from the second video; and wherein placing the content stream containing content from the second category of content types within the location inclusive of the visual discontinuity comprises aligning the eye level of the first participant and the second participant on the GUI and placing the aligned first and second videos within the location inclusive of the visual discontinuity.

In Example 139, the subject matter of Example 138 includes, wherein the operations of aligning the eye level of the first participant and the second participant on the GUI comprises aligning the eye level with a camera placed within the visual discontinuity.

In Example 140, the subject matter of Example 139 includes, wherein the operations comprise removing a background from the first video of the first participant and removing a background from the second video of the second participant prior to placement in the location inclusive of the visual discontinuity.

In Example 141, the subject matter of Example 140 includes, wherein the operations comprise placing video of the first participant and the second participant on a common background in the location inclusive of the visual discontinuity.

In Example 142, the subject matter of Examples 137-141 includes, wherein the visual discontinuity is an aperture for a camera or a camera on the display device.

In Example 143, the subject matter of Examples 137-142 includes, wherein the operations of placing the content stream containing content from a second category of content types within the location inclusive of the visual discontinuity comprises inserting black pixels at the location of the visual discontinuity within the GUI.

Example 144 is a method for minimizing distracting content layout of a graphical user interface (GUI) of a network-based communication session when that GUI is displayed on a display device having an area of visual discontinuity, the method comprising, using one or more processors: determining that the GUI of a network-based communication session is to be displayed on the display device having the area of visual discontinuity; responsive to the determining that the GUI is to be displayed on the display device having the area of visual discontinuity: identifying a location of the visual discontinuity of the display device; identifying a location within the GUI corresponding to the location of the visual discontinuity of the display device; determining a placement of a plurality of content streams of the network-based communication session in the GUI by the sequential steps of: evaluating the plurality of content streams to determine whether the content streams include, content from a first category of content types, the first category of content types comprising one or more of document, application, or screen sharing content; responsive to determining that the content streams include content from the first category of content types, prioritizing placement of content streams showing content from the first category of content types at locations of the GUI exclusive of the visual discontinuity; and placing a content stream containing content from a second category of content types within the location inclusive of the visual discontinuity, the second category of content types comprising video content; and displaying the GUI according to the determined placement.

In Example 145, the subject matter of Example 144 includes, wherein the plurality of content streams comprises a first video and a second video, wherein the method further comprises: identifying an eye level of a first participant from the first video; identifying an eye level of a second participant from the second video; and wherein placing the content stream containing content from the second category of content types within the location inclusive of the visual discontinuity comprises aligning the eye level of the first participant and the second participant on the GUI and placing the aligned first and second videos within the location inclusive of the visual discontinuity.

In Example 146, the subject matter of Example 145 includes, wherein aligning the eye level of the first participant and the second participant on the GUI comprises aligning the eye level with a camera placed within the visual discontinuity.

In Example 147, the subject matter of Example 146 includes, removing a background from the first video of the first participant and removing a background from the second video of the second participant prior to placement in the location inclusive of the visual discontinuity.

In Example 148, the subject matter of Example 147 includes, placing video of the first participant and the second participant on a common background in the location inclusive of the visual discontinuity.

In Example 149, the subject matter of Examples 144-148 includes, wherein the visual discontinuity is an aperture for a camera or a camera on the display device.

In Example 150, the subject matter of Examples 144-149 includes, wherein placing the content stream containing content from a second category of content types within the location inclusive of the visual discontinuity comprises inserting black pixels at the location of the visual discontinuity within the GUI.

Example 151 is a device for minimizing distracting content layout of a graphical user interface (GUI) of a network-based communication session when that GUI is displayed on a display device having an area of visual discontinuity, the device comprising: means for determining that the GUI of a network-based communication session is to be displayed on the display device having the area of visual discontinuity; means for, responsive to the determining that the GUI is to be displayed on the display device having the area of visual discontinuity: means for identifying a location of the visual discontinuity of the display device; means for identifying a location within the GUI corresponding to the location of the visual discontinuity of the display device; means for determining a placement of a plurality of content streams of the network-based communication session in the GUI by the sequential steps of: means for evaluating the plurality of content streams to determine whether the content streams include, content from a first category of content types, the first category of content types comprising one or more of document, application, or screen sharing content; means for, responsive to determining that the content streams include content from the first category of content types, prioritizing placement of content streams showing content from the first category of content types at locations of the GUI exclusive of the visual discontinuity; and means for placing a content stream containing content from a second category of content types within the location inclusive of the visual discontinuity, the second category of content types comprising video content; and means for displaying the GUI according to the determined placement.

In Example 152, the subject matter of Example 151 includes, wherein the plurality of content streams comprises a first video and a second video, wherein the device further comprises: means for identifying an eye level of a first participant from the first video; means for identifying an eye level of a second participant from the second video; and wherein the means for placing the content stream containing content from the second category of content types within the location inclusive of the visual discontinuity comprises means for aligning the eye level of the first participant and the second participant on the GUI and means for placing the aligned first and second videos within the location inclusive of the visual discontinuity.

In Example 153, the subject matter of Example 152 includes, wherein the means for aligning the eye level of the first participant and the second participant on the GUI comprises means for aligning the eye level with a camera placed within the visual discontinuity.

In Example 154, the subject matter of Example 153 includes, means for removing a background from the first video of the first participant and means for removing a background from the second video of the second participant prior to placement in the location inclusive of the visual discontinuity.

In Example 155, the subject matter of Example 154 includes, means for placing video of the first participant and the second participant on a common background in the location inclusive of the visual discontinuity.

In Example 156, the subject matter of Examples 151-155 includes, wherein the visual discontinuity is an aperture for a camera or a camera on the display device.

In Example 157, the subject matter of Examples 151-156 includes, wherein the means for placing the content stream containing content from a second category of content types within the location inclusive of the visual discontinuity comprises means for inserting black pixels at the location of the visual discontinuity within the GUI.

Example 158 is a machine-readable medium, storing instructions for minimizing distracting content layout of a graphical user interface (GUI) of a network-based communication session when that GUI is displayed on a display device having an area of visual discontinuity, the instructions, when executed by a machine, cause the machine to perform operations comprising: determining that the GUI of a network-based communication session is to be displayed on the display device having the area of visual discontinuity; responsive to the determining that the GUI is to be displayed on the display device having the area of visual discontinuity: identifying a location of the visual discontinuity of the display device; identifying a location within the GUI corresponding to the location of the visual discontinuity of the display device; determining a placement of a plurality of content streams of the network-based communication session in the GUI by the sequential steps of: evaluating the plurality of content streams to determine whether the content streams include, content from a first category of content types, the first category of content types comprising one or more of document, application, or screen sharing content; responsive to determining that the content streams include content from the first category of content types, prioritizing placement of content streams showing content from the first category of content types at locations of the GUI exclusive of the visual discontinuity; and placing a content stream containing content from a second category of content types within the location inclusive of the visual discontinuity, the second category of content types comprising video content; and displaying the GUI according to the determined placement.

In Example 159, the subject matter of Example 158 includes, wherein the plurality of content streams comprises a first video and a second video, wherein the operations further comprise: identifying an eye level of a first participant from the first video; identifying an eye level of a second participant from the second video; and wherein placing the content stream containing content from the second category of content types within the location inclusive of the visual discontinuity comprises aligning the eye level of the first participant and the second participant on the GUI and placing the aligned first and second videos within the location inclusive of the visual discontinuity.

In Example 160, the subject matter of Example 159 includes, wherein the operations of aligning the eye level of the first participant and the second participant on the GUI comprises aligning the eye level with a camera placed within the visual discontinuity.

In Example 161, the subject matter of Example 160 includes, wherein the operations comprise removing a background from the first video of the first participant and removing a background from the second video of the second participant prior to placement in the location inclusive of the visual discontinuity.

In Example 162, the subject matter of Example 161 includes, wherein the operations comprise placing video of the first participant and the second participant on a common background in the location inclusive of the visual discontinuity.

In Example 163, the subject matter of Examples 158-162 includes, wherein the visual discontinuity is an aperture for a camera or a camera on the display device.

In Example 164, the subject matter of Examples 158-163 includes, wherein the operations of placing the content stream containing content from a second category of content types within the location inclusive of the visual discontinuity comprises inserting black pixels at the location of the visual discontinuity within the GUI.

Example 165 is at least one machine-readable medium including instructions that, when executed by processing circuitry, cause the processing circuitry to perform operations to implement of any of Examples 1-164.

Example 166 is an apparatus comprising means to implement of any of Examples 1-164.

Example 167 is a system to implement of any of Examples 1-164.

Example 168 is a method to implement of any of Examples 1-164.

What is claimed is:

1. A computing device for identifying a content layout of a graphical user interface (GUI) of a network-based communication session on a display, the computing device comprising:
one or more hardware processors;
one or more memories, the one or more memories storing instructions, which when executed, causes the one or more hardware processors to perform operations comprising:
identifying that the display includes an area allowing passage of light to a camera behind the display;
responsive to identifying that the display includes the area allowing passage of light to the camera behind the display:
identifying a location of the area in the display;
identifying a first location within the GUI corresponding to the location of the area in the display; and
determining a placement of a plurality of content streams of the network-based communication session in the GUI by placing a content stream of a plurality of content streams of the network-based communication session showing content from a first category of content types at the first location of the GUI, and by placing a second content stream of the plurality of content streams showing content from a second category of content types at a second location of the GUI, the second location not including any of the first location, the first category of content types being video content, and the second category of content types being one or more of document content, screen sharing content, or application sharing content, the first location does not including content from the second category of content types and the second location does not include content from the first category of content types; and
displaying the GUI according to the determined placement.

2. The computing device of claim 1, wherein the area allowing passage of light to the camera is a hole in a projection screen.

3. The computing device of claim 1, wherein the area allowing passage of light to the camera is a portion of the display that allows light transmission through a solid portion of the display.

4. The computing device of claim 1, wherein a camera is positioned behind the area allowing passage of light to the camera, the camera capturing video of a participant.

5. The computing device of claim 1, wherein the plurality of content streams comprise a first video and a second video, wherein the operations further comprise:
identifying an eye level of a first participant from the first video;
identifying an eye level of a second participant from the second video; and
aligning the identified eye levels of the first video of the first participant and the second video of the second participant in the GUI within the first location.

6. The computing device of claim 5, wherein the operations of aligning the eye levels comprises also aligning the eye levels with the camera.

7. The computing device of claim 1, wherein the operations further comprise removing a background from a first video of a first participant and removing a background from a second video of a second participant and placing the first and second videos in the first location.

8. A method for identifying a content layout of a graphical user interface (GUI) of a network-based communication session on a display, the method comprising:
identifying that the display includes an area allowing passage of light to a camera behind the display;
responsive to identifying that the display includes the area allowing passage of light to the camera behind the display:
identifying a location of the area in the display;
identifying a first location within the GUI corresponding to the location of the area in the display; and
determining a placement of a plurality of content streams of the network-based communication session in the GUI by placing a content stream of a plurality of content streams of the network-based communication session showing content from a first category of content types at the first location of the GUI, and by placing a second content stream of the plurality of content streams showing content from a second category of content types at a second location of the GUI, the second location not including any of the first location, the first category of content types being video content, and the second category of content types being one or more of document content, screen sharing content, or application sharing content, the first location does not including content from the second category of content types and the second location does not include content from the first category of content types; and
displaying the GUI according to the determined placement.

9. The method of claim 8, wherein the area allowing passage of light to the camera is a hole in a projection screen.

10. The method of claim 8, wherein the area allowing passage of light to the camera is a portion of the display that allows light transmission through a solid portion of the display.

11. The method of claim 8, wherein a camera is positioned behind the area allowing passage of light to the camera, the camera capturing video of a participant.

12. The method of claim 8, wherein the plurality of content streams comprise a first video and a second video, wherein the method further comprises:
identifying an eye level of a first participant from the first video;
identifying an eye level of a second participant from the second video; and
aligning the identified eye levels of the first video of the first participant and the second video of the second participant in the GUI within the first location.

13. The method of claim 12, wherein aligning the eye levels comprises also aligning the eye levels with the camera.

14. The method of claim 8, further comprising removing a background from a first video of a first participant and removing a background from a second video of a second participant and placing the first and second videos in the first location.

15. A non-transitory machine-readable medium, storing instructions for identifying a content layout of a graphical user interface (GUI) of a network-based communication session on a display, the instructions, when executed by a machine, causes the machine to perform operations comprising:
identifying that the display includes an area allowing passage of light to a camera behind the display;

responsive to identifying that the display includes the area allowing passage of light to the camera behind the display:

identifying a location of the area in the display;

identifying a first location within the GUI corresponding to the location of the area in the display; and determining a placement of a plurality of content streams of the network-based communication session in the GUI by placing a content stream of a plurality of content streams of the network-based communication session showing content from a first category of content types at the first location of the GUI, and by placing a second content stream of the plurality of content streams showing content from a second category of content types at a second location of the GUI, the second location not including any of the first location, the first category of content types being video content, and the second category of content types being one or more of document content, screen sharing content, or application sharing content, the first location does not including content from the second category of content types and the second location does not include content from the first category of content types; and displaying the GUI according to the determined placement.

16. The non-transitory machine-readable medium of claim 15, wherein the area allowing passage of light to the camera is a hole in a projection screen.

17. The non-transitory machine-readable medium of claim 15, wherein the area allowing passage of light to the camera is a portion of the display that allows light transmission through a solid portion of the display.

18. The non-transitory machine-readable medium of claim 15, wherein a camera is positioned behind the area allowing passage of light to the camera, the camera capturing video of a participant.

19. The non-transitory machine-readable medium of claim 14, wherein the plurality of content streams comprise a first video and a second video, wherein the operations further comprise:

identifying an eye level of a first participant from the first video;

identifying an eye level of a second participant from the second video; and aligning the identified eye levels of the first video of the first participant and the second video of the second participant in the GUI within the first location.

20. The non-transitory machine-readable medium of claim 19, wherein the operations of aligning the eye levels comprises also aligning the eye levels with the camera.

* * * * *